US012725593B2

(12) United States Patent
Sato

(10) Patent No.: US 12,725,593 B2
(45) Date of Patent: Sep. 1, 2026

(54) EFFECT ADDING APPARATUS, METHOD, AND ELECTRONIC MUSICAL INSTRUMENT

(71) Applicant: CASIO COMPUTER CO., LTD., Tokyo (JP)

(72) Inventor: Hiroki Sato, Nishitokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 1351 days.

(21) Appl. No.: 17/491,711

(22) Filed: Oct. 1, 2021

(65) Prior Publication Data

US 2022/0020347 A1 Jan. 20, 2022

Related U.S. Application Data

(62) Division of application No. 16/828,658, filed on Mar. 24, 2020, now Pat. No. 11,170,746.

(30) Foreign Application Priority Data

Mar. 25, 2019 (JP) ................................ 2019-056726

(51) Int. Cl.

| | |
|---|---|
| ***G10H 1/053*** | (2006.01) |
| ***G10H 1/00*** | (2006.01) |
| ***G10H 1/34*** | (2006.01) |

(52) U.S. Cl.

CPC ........... *G10H 1/053* (2013.01); *G10H 1/0008* (2013.01); *G10H 1/344* (2013.01); *G10H 2220/221* (2013.01)

(58) Field of Classification Search

CPC ...... G10H 1/053; G10H 1/0008; G10H 1/344; G10H 2220/221; G10H 2210/215;

(Continued)

(56) References Cited

U.S. PATENT DOCUMENTS 4,998,457 A * 3/1991 Suzuki ..................... G10H 1/32 341/27

5,313,010 A * 5/1994 Matsushima ............ G10H 1/00 84/743

(Continued)

FOREIGN PATENT DOCUMENTS

JP H06167970 A 6/1994

JP H06195073 A 7/1994

(Continued)

OTHER PUBLICATIONS

Office Action (Non-Final Rejection) dated Apr. 15, 2021 issued in U.S. Appl. No. 16/828,658.

*Primary Examiner* — Jeffrey Donels

(74) *Attorney, Agent, or Firm* — Holtz, Holtz & Volek PC

(57) ABSTRACT

An effect adding apparatus includes a plurality of first operation elements operable by a user to change parameters assigned to the respective first operation elements; and at least one processor configured to: select a parameter to be assigned to each of the first operation elements, from among a plurality of parameters corresponding to designated effects, the designated effects being effects designated from among plural selectable effects; when a plurality of the plural selectable effects including a first effect and other effects are to be used in combination as the designated effects, change the parameters to be assigned to the plurality of first operation elements from among the plurality of parameters corresponding to the first effect in response to a change in the other effects to be combined with the first effect; and add the designated effects to a musical sound generated by a sound source.

8 Claims, 21 Drawing Sheets

(58) Field of Classification Search
CPC ............... G10H 2210/281; G10H 1/06; G10H 2210/231; G10H 2210/311; G10H 2220/106; G10H 1/0091; G10H 2210/325; G10H 2220/201; G10H 2220/395; G10H 2210/221; G10H 2220/391; G10H 2220/315; G10H 1/46; G10H 2210/525; G10H 2220/246; G10H 1/34
See application file for complete search history.

(56) References Cited

U.S. PATENT DOCUMENTS

| | | | | |
|---|---|---|---|---|
| 5,559,301 | A * | 9/1996 | Bryan, Jr. | G10H 1/0008 715/833 |
| 5,648,626 | A * | 7/1997 | Okamoto | G10H 1/34 84/670 |
| 5,652,797 | A | 7/1997 | Okamura et al. | |
| 7,116,310 | B1 * | 10/2006 | Evans | G06F 3/038 345/169 |
| 7,135,637 | B2 * | 11/2006 | Nishitani | A63B 71/0686 84/723 |
| 9,640,158 | B1 * | 5/2017 | Baker | G10H 1/0008 |
| 2004/0159218 | A1 * | 8/2004 | Aiso | G10H 1/08 84/625 |
| 2009/0069916 | A1 * | 3/2009 | Homburg | G06F 3/0487 700/94 |
| 2010/0024628 | A1 * | 2/2010 | Maruyama | G10H 1/0091 84/615 |
| 2015/0078584 | A1 * | 3/2015 | Moon | H03G 3/04 381/104 |
| 2020/0312288 | A1 * | 10/2020 | Sato | G10H 1/0008 |

FOREIGN PATENT DOCUMENTS

| | | |
|---|---|---|
| JP | 2003015643 A | 1/2003 |
| JP | 2005043457 A | 2/2005 |

* cited by examiner

FIG. 4

| EFFECT TYPE NUMBER | EFFECT NAME | NUMBER OF PARAMETERS | PARAMETER NUMBER | PARAMETER NAME | FUNCTION | VALUE RANGE | SIGNIFICANCE | PAIRING PARAMETER NUMBER | PAIRING REASON |
|---|---|---|---|---|---|---|---|---|---|
| 0 | WAH | 4 | 0 | Type | WAH TYPE | 0 – 3 | 1 | −1 | |
| | | | 1 | Manual | WAH REFERENCE POSITION | 0 – 127 | 10 | −1 | |
| | | | 2 | Auto Depth | AUTO WAH SENSITIVITY | -127 | 6 | −1 | |
| | | | 3 | Level | OUTPUT LEVEL | 0 – 127 | 4 | −1 | |

FIG. 5

| EFFECT TYPE NUMBER | EFFECT NAME | NUMBER OF PARAMETERS | PARAMETER NUMBER | PARAMETER NAME | FUNCTION | VALUE RANGE | SIGNIFICANCE | PAIRING PARAMETER NUMBER | PAIRING REASON |
|---|---|---|---|---|---|---|---|---|---|
| 1 | 3-BAND EQUALIZER | 7 | 0 | EQ1 Frequency | EQUALIZER 1 CENTER FREQUENCY | 0 – 127 | 8 | 1 | Gain IS ALSO ASSIGNED WHEN Gain OF EQ1 IS 0 BECAUSE Frequency CHANGE HAS NO EFFECT IN SUCH CASE. |
| | | | 1 | EQ1 Gain | EQUALIZER 1 GAIN | −24 | 7 | −1 | |
| | | | 2 | EQ2 Frequency | EQUALIZER 2 CENTER FREQUENCY | 0 – 127 | 6 | 3 | Gain IS ALSO ASSIGNED WHEN Gain OF EQ2 IS 0 BECAUSE Frequency CHANGE HAS NO EFFECT IN SUCH CASE. |
| | | | 3 | EQ2 Gain | EQUALIZER 2 GAIN | −24 | 5 | −1 | |
| | | | 4 | EQ3 Frequency | EQUALIZER 3 CENTER FREQUENCY | 0 – 127 | 4 | 5 | Gain IS ALSO ASSIGNED WHEN Gain OF EQ3 IS 0 BECAUSE Frequency CHANGE HAS NO EFFECT IN SUCH CASE. |
| | | | 5 | EQ3 Gain | EQUALIZER 3 GAIN | −24 | 3 | −1 | |
| | | | 6 | Level | OUTPUT LEVEL | 0 – 127 | 2 | −1 | |

FIG. 6

| EFFECT TYPE NUMBER | EFFECT NAME | NUMBER OF PARAMETERS | PARAMETER NUMBER | PARAMETER NAME | FUNCTION | VALUE RANGE | SIGNIFICANCE | PAIRING PARAMETER NUMBER | PAIRING REASON |
|---|---|---|---|---|---|---|---|---|---|
| 2 | COMPRESSOR | 3 | 0 | Attack | ATTACK AMOUNT | 0 – 127 | 3 | −1 | |
| | | | 1 | Release | COMPRESSION EFFECT RELEASE TIME | 0 – 127 | 5 | −1 | |
| | | | 2 | Ratio | COMPRESSION RATE | 0 – 127 | 4 | 3 | CHANGE IN COMPRESSION RATE LEADS TO LARGE CHANGE IN OUTPUT LEVEL. THUS, Level NEEDS TO BE ADJUSTED FOR CORRECTION. |
| | | | 3 | Level | OUTPUT LEVEL | 0 – 127 | 5 | −1 | |
| 3 | OVERDRIVE | 3 | 0 | Gain | GAIN | 0 – 127 | 8 | 2 | CHANGE IN GAIN LEADS TO CHANGE IN OUTPUT LEVEL. THUS, Level NEEDS TO BE ADJUSTED FOR CORRECTION. |
| | | | 1 | Tone | TONE CONTROL LEVEL | 0 – 127 | 7 | −1 | |
| | | | 2 | Level | OUTPUT LEVEL | 0 – 127 | 6 | −1 | |
| 4 | DISTORTION | 4 | 0 | Gain | GAIN | 0 – 127 | 8 | 3 | CHANGE IN GAIN LEADS TO CHANGE IN OUTPUT LEVEL. THUS, Level NEEDS TO BE ADJUSTED FOR CORRECTION. |
| | | | 1 | Tone Low | HIGH TONE CONTROL | 0 – 127 | 4 | −1 | |
| | | | 2 | Tone High | LOW TONE CONTROL | 0 – 127 | 4 | −1 | |
| | | | 3 | Level | OUTPUT LEVEL | 0 – 127 | 5 | −1 | |

FIG. 7

| EFFECT TYPE NUMBER | EFFECT NAME | NUMBER OF PARAMETERS | PARAMETER NUMBER | PARAMETER NAME | FUNCTION | VALUE RANGE | SIGNIFICANCE | PAIRING PARAMETER NUMBER | PAIRING REASON |
|---|---|---|---|---|---|---|---|---|---|
| 5 | SPEAKER SIMULATOR | 3 | 0 | Speaker Type | SPEAKER TYPE | 0 - 15 | 3 | −1 | |
| | | | 1 | Mic Position | MICROPHONE POSITION | 0 – 15 | 2 | −1 | |
| | | | 2 | Level | OUTPUT LEVEL | 0 – 127 | 1 | −1 | |
| 6 | ROTARY SPEAKER | 9 | 0 | Type | ROTARY SPEAKER TYPE | 0, 1 | 1 | −1 | |
| | | | 1 | Speed | SPEED SWITCHING | 0, 1 | 10 | −1 | |
| | | | 2 | Brake | BRAKE | 0, 1 | 8 | −1 | |
| | | | 3 | Fall Accel | ACCELERATION FOR ROTATION SPEED REDUCTION | 0 – 127 | 2 | 1 | REFLECTED AFTER Speed SWITCHING. THUS, Speed SWITCHING IS REQUIRED. |
| | | | 4 | Rise Accel | ACCELERATION FOR ROTATION SPEED INCREASE | 0 – 127 | 1 | 1 | REFLECTED AFTER Speed SWITCHING. THUS, Speed SWITCHING IS REQUIRED. |
| | | | 5 | Slow Rate | SPEED OF LOW SPEED ROTATION | 0 – 127 | 5 | 1 | CHANGE IS NOT REFLECTED WITH HIGH SPEED ROTATION. THUS, Speed SWITCH IS REQUIRED FOR MAKING SURE THAT LOW SPEED CAN BE SELECTED. |
| | | | 6 | Fast Rate | SPEED OF HIGH SPEED ROTATION | 0 – 127 | 5 | 1 | CHANGE IS NOT REFLECTED WITH LOW SPEED ROTATION. THUS, Speed SWITCH IS REQUIRED FOR MAKING SURE THAT LOW SPEED CAN BE SELECTED. |
| | | | 7 | Vibrato Type | VIBRATO TYPE | 0 – 7 | 4 | −1 | |
| | | | 8 | Level | OUTPUT LEVEL | 0 – 127 | 5 | −1 | |

FIG. 8

| EFFECT TYPE NUMBER | EFFECT NAME | NUMBER OF PARAMETERS | PARAMETER NUMBER | PARAMETER NAME | FUNCTION | VALUE RANGE | SIGNIFICANCE | PAIRING PARAMETER NUMBER | PAIRING REASON |
|---|---|---|---|---|---|---|---|---|---|
| 7 | PHASER | 6 | 0 | LFO Rate | MODULATION SPEED | 0 – 127 | 7 | –1 | |
| | | | 1 | LFO Depth | MODULATION DEPTH | 0 – 127 | 6 | –1 | |
| | | | 2 | LFO Waveform | MODULATION WAVEFORM | 0 – 3 | 2 | –1 | |
| | | | 3 | Resonance | SOUND CHARACTERISTICS | 0 – 127 | 4 | –1 | |
| | | | 4 | Manual | PHASE SHIFT REFERENCE VALUE | –127 | 3 | –1 | |
| | | | 5 | Level | OUTPUT LEVEL | 0 – 127 | 2 | –1 | |
| 8 | FLANGER | 6 | 0 | LFO Rate | MODULATION SPEED | 0 – 127 | 8 | –1 | |
| | | | 1 | LFO Depth | MODULATION DEPTH | 0 – 127 | 6 | –1 | |
| | | | 2 | LFO Waveform | MODULATION WAVEFORM | 0 – 127 | 2 | –1 | |
| | | | 3 | Feedback | SOUND CHARACTERISTICS | –127 | 9 | –1 | |
| | | | 4 | Manual | DELAY TIME REFERENCE VALUE | 0 – 127 | 5 | –1 | |
| | | | 5 | Level | OUTPUT LEVEL | 0 – 127 | 4 | –1 | |
| 9 | CHORUS | 4 | 0 | LFO Rate | MODULATION SPEED | 0 – 127 | 7 | –1 | |
| | | | 1 | LFO Depth | MODULATION DEPTH | 0 – 127 | 8 | –1 | |
| | | | 2 | LFO Waveform | MODULATION WAVEFORM | 0 – 127 | 2 | –1 | |
| | | | 3 | Level | OUTPUT LEVEL | 0 – 127 | 1 | –1 | |

FIG. 9

| EFFECT TYPE NUMBER | EFFECT NAME | NUMBER OF PARAMETERS | PARAMETER NUMBER | PARAMETER NAME | FUNCTION | VALUE RANGE | SIGNIFICANCE | PAIRING PARAMETER NUMBER | PAIRING REASON |
|---|---|---|---|---|---|---|---|---|---|
| 10 | DELAY | 5 | 0 | Delay Time | DELAY TIME | 0 – 127 | 8 | -1 | |
| | | | 1 | Delay Level | DELAY SIGNAL LEVEL | 0 – 127 | 7 | -1 | |
| | | | 2 | Feedback | REPETITION AMOUNT | 0 – 127 | 6 | -1 | |
| | | | 3 | High Damp | HIGH RANGE DAMPING AMOUNT | 0 – 127 | 3 | -1 | |
| | | | 4 | Dry Level | SOURCE SIGNAL LEVEL | 0 – 127 | 2 | -1 | |
| 11 | REVERB | 5 | 0 | Reverb Type | REVERB TYPE | 0 – 15 | 7 | 1 | REVERB TIME LARGELY CHANGES DEPENDING ON REVERB TYPE, EVEN WHEN THE SAME Reverb Time VALUE IS SET. THUS, TIME READJUSTMENT IS LIKELY TO BE REQUIRED AFTER TYPE SWITCHING. |
| | | | 1 | Reverb Time | REVERB TIME | 0 – 127 | 8 | -1 | |
| | | | 2 | Early Reflection | INITIAL REFLECTION AMOUNT | 0 – 127 | 3 | -1 | |
| | | | 3 | High Damp | HIGH RANGE DAMPING AMOUNT | 0 – 127 | 2 | -1 | |
| | | | 4 | Reverb Level | REVERB SIGNAL LEVEL | 0 – 127 | 5 | -1 | |

*FIG. 12A*

| EFFECT MODULE NUMBER | EFFECT TYPE NUMBER (−1 IF NOT ASSIGNED) |
|---|---|
| 0 | ModType[0] |
| 1 | ModType[1] |
| 2 | ModType[2] |
| 3 | ModType[3] |

*FIG. 12B*

| CONTROLLER NAME | CONTROLLER INTERNAL NUMBER | VALIDATION FLAG (0... INVALID, 1... VALID) | EFFECT MODULE NUMBER (−1... INVALID) | EFFECT TYPE NUMBER (−1... INVALID) | EFFECT PARAMETER NUMBER (−1... INVALID) | SIGNIFICANCE (−1... INVALID) | PAIRING PARAMETER NUMBER (−1... INVALID) |
|---|---|---|---|---|---|---|---|
| C1 | 0 | CtrlValid[0] | CtrlMod[0] | CtrlType[0] | CtrlParam[0] | CtrlSig[0] | CtrlPair[0] |
| C2 | 1 | CtrlValid[1] | CtrlMod[1] | CtrlType[1] | CtrlParam[1] | CtrlSig[1] | CtrlPair[1] |
| : | : | : | : | : | : | : | : |
| C6 | 5 | CtrlValid[5] | CtrlMod[5] | CtrlType[5] | CtrlParam[5] | CtrlSig[5] | CtrlPair[5] |
| SUBSTITUTE | 6 | CtrlValid[6] | CtrlMod[6] | CtrlType[6] | CtrlParam[6] | CtrlSig[6] | CtrlPair[6] |

EFFECT ADDING APPARATUS, METHOD, AND ELECTRONIC MUSICAL INSTRUMENT

CROSS-REFERENCE TO RELATED APPLICATION

This application is a Divisional Application of U.S. application Ser. No. 16/828,658, filed Mar. 24, 2020 which is based upon and claims the benefit of priority from Japanese Patent Application No. 2019-056726, filed Mar. 25, 2019, the entire contents of all of which are incorporated herein by reference.

BACKGROUND OF THE INVENTION

Technical Field

The present invention relates to an effect adding apparatus, a method, and an electronic musical instrument for adding various sound effects by processing an audio signal such as a musical sound signal.

Background Art

Effect adding apparatuses that add an effect to a received audio signal (such as a musical sound signal) and outputs the resultant signal are known as effectors. The effectors, conventionally, have included a type that is equipped with a technique of enabling a plurality of types of effects to be combined as desired to be added. This is known as a multi effector (for example, a technique described in Japanese Unexamined Patent Application Publication No. 6-195073). A user who operates such a multi effector performs a preparation work. Specifically, a selection operation is performed so that desired effects, in available effects, are implemented in the desired sequence. Then, the user sets a value of one or more settable parameters for each of the selected effects (such as a delay time and a feedback amount for a delay effect).

Generally, a keyboard having a plurality of effect modules installed and a single multi effector have the following function. Specifically, the desired effect parameters are assigned to controller operation elements (which are usually less than the number of effect parameters) such as knobs and pedals, and the user changes the parameter during his or her musical performance For example, the keyboard is equipped with six slider volumes each of which is controlled with any parameter of any effect module assigned thereto. Conventionally, it has been a user's responsibility to allocate the parameters of the effects one by one to the operation elements.

This method with the user allocating the parameters of the effects to the operation elements one by one does yield a desired result. Still, the method requires the user to think what parameter of which effect module he or she should allocate to the operation element, for setting up each combination of effects. This could be quite a burden on the user.

With the present invention, parameters are satisfactory assigned to a plurality of respective controllers, in response to selection of an effect module by a user.

SUMMARY OF THE INVENTION

An effect adding apparatus according to an example of an aspect includes:

a plurality of first operation elements on which a first user operation is performed;

a plurality of second operation elements on which a second user operation is performed after the first user operation; and at least one processor, in which the at least one processor determines two or more effects from a plurality of effects based on the first user operation, wherein the two or more effects include a first effect that is associated with a plurality of first parameters and a second effect that is associated with a plurality of second parameters, and determines parameters that are assigned to the plurality of second operation elements, a parameter is assigned to each of the plurality of second operation elements, based on data indicating significance of each of the plurality of first parameters and data indicating significance of each of the plurality of second parameters.

BRIEF DESCRIPTION OF THE DRAWINGS

FIG. 4 is a diagram illustrating a data configuration example of an effect parameter table;

FIG. 5 is a diagram illustrating a data configuration example of an effect parameter table;

FIG. 6 is a diagram illustrating a data configuration example of an effect parameter table;

FIG. 7 is a diagram illustrating a data configuration example of an effect parameter table;

FIG. 8 is a diagram illustrating a data configuration example of an effect parameter table;

FIG. 9 is a diagram illustrating a data configuration example of an effect parameter table;

FIGS. 12A and 12B are diagrams respectively illustrating a configuration example of data in an effect module-effect type table, and a controller-parameter assignment variable table.

DETAILED DESCRIPTION OF EMBODIMENTS

Figure 1:
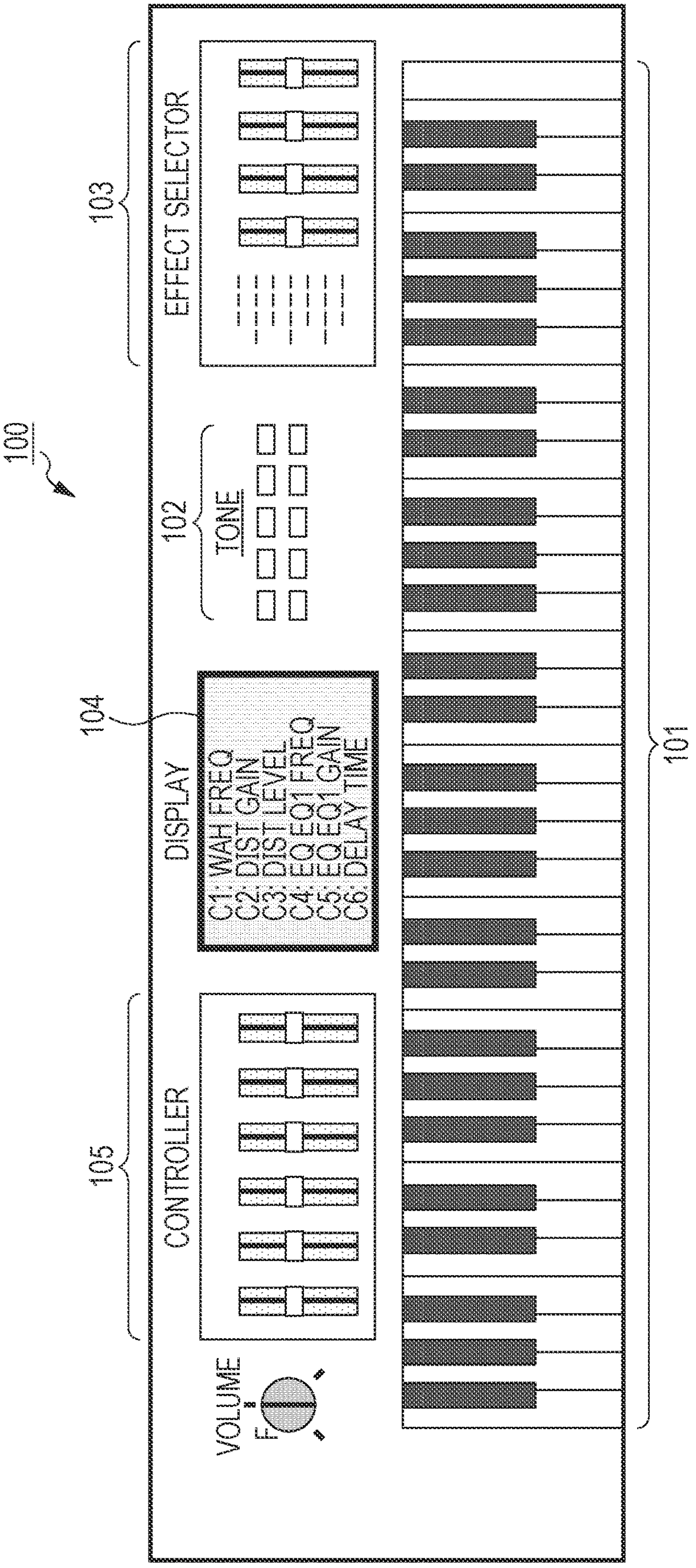
FIG. 1 illustrates an example of an external appearance of an embodiment of an electronic keyboard instrument.

Hereinafter, embodiments for carrying out the present invention will be described in detail with reference to the drawings. FIG. 1 is a diagram illustrating an example of an external appearance of an embodiment of an electronic keyboard instrument 100 having what is known as a multi-effect function. The electronic keyboard instrument 100 includes elements such as: a keyboard 101 (a performance operation element operated by a third user operation) including a plurality of keys and serving as a performance operation element; a switch panel 102 for various setting instructions such as designation of a tone of a musical sound output from the electronic keyboard instrument 100; an effect module selection panel 103 for performing selection on the multi effector (a plurality of first operation elements operated by a first user operation); an effect parameter controller panel 105 for controlling parameters of the multi-effector (a plurality of second operation elements operated by a second user operation); and a Liquid Crystal Display (LCD) 104 that displays various types of setting information. The electronic keyboard instrument 100 further includes: a volume knob serving as both a power switch and a volume adjustment unit in a left portion; and speakers (not illustrated) that emit musical sound produced as a result of playing on the instrument, on the back surface, side surfaces, the bottom surface, or the like.

Figure 2:
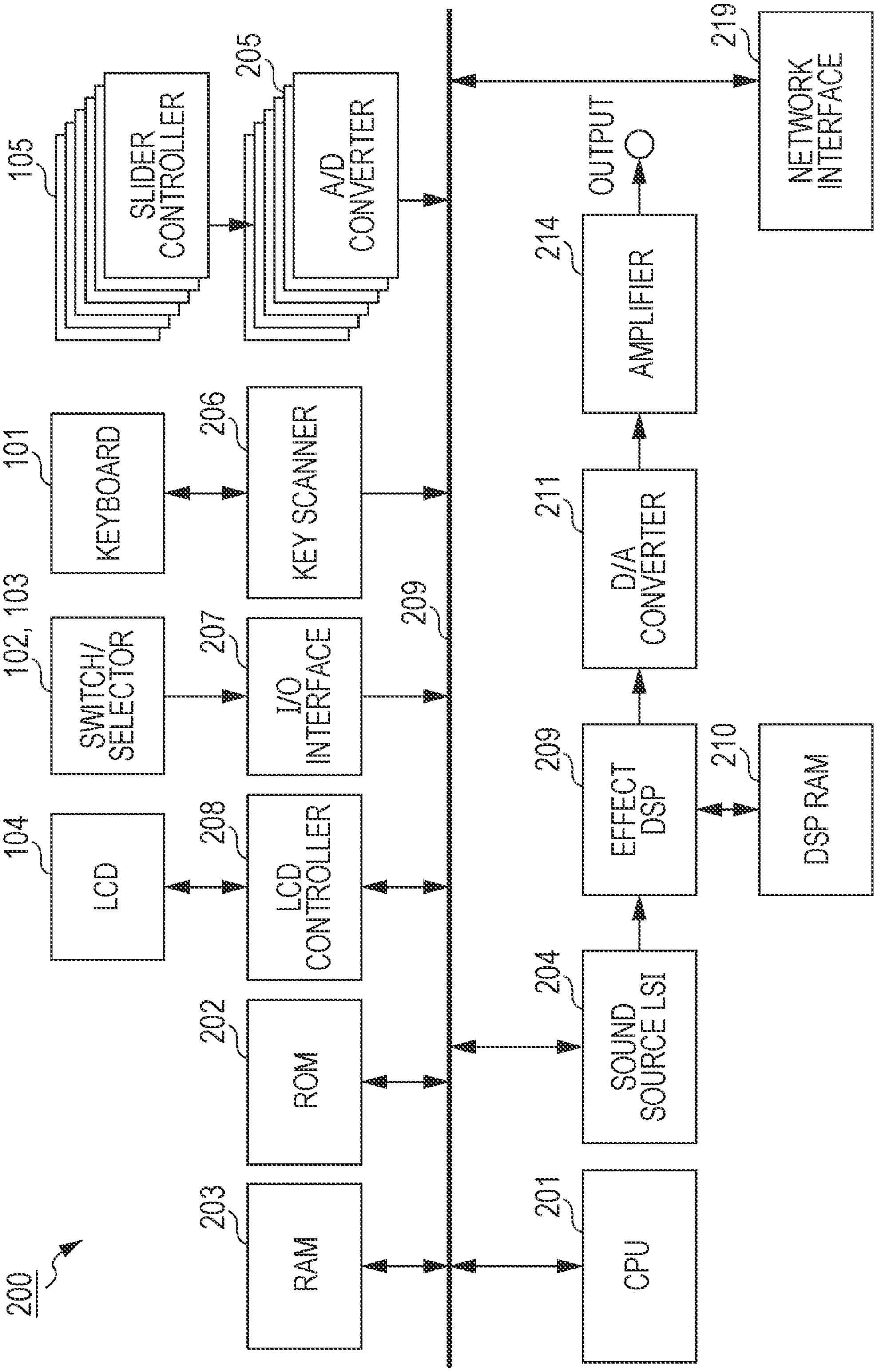
FIG. 2 is a block diagram illustrating an example of a hardware configuration of an embodiment of a control system of the electronic keyboard instrument.

FIG. 2 is a diagram illustrating an example of a hardware configuration of an embodiment of a control system 200 of the electronic keyboard instrument 100 illustrated in FIG. 1. In FIG. 2, the control system 200 includes: a Central Processing Unit (CPU) 201; a Read Only Memory (ROM) 202; a Random Access Memory (RAM) 203; a sound source Large Scale Integrated Circuit (LSI) 204; a key scanner 206 connected with the keyboard 101 illustrated in FIG. 1; an I/O interface 207 connected with the switch panel 102 and the effect selector 103 illustrated in FIG. 1; an A/D converter 205 that acquires an operation position of each of the six control sliders on the effect parameter controller panel 105 illustrated in FIG. 1; a network interface 219; and an LCD controller 208 connected with the LCD 104 illustrated in FIG. 1. These elements are each connected to a system bus 209. The sound source LSI 204 has an output side connected with an effect Digital Signal Processor (DSP) 209 to which a DSP RAM 210 is connected, a D/A converter 211, and an amplifier 214 in this order.

The CPU 201 executes a control program stored in the ROM 202 while using the RAM 203 as a work memory, to implement a control operation for the electronic keyboard instrument 100 illustrated in FIG. 1. The ROM 202 stores song data including lyrics data and accompaniment data, in addition to the control program and various types of fixed data.

The sound source LSI 204 reads, for example, musical sound waveform data from a waveform ROM (not illustrated), and outputs the data thus read to the D/A converter 211 in response to a sound generation control instruction from the CPU 201. The sound source LSI 204 has the ability to oscillate up to 256 voices at once.

The key scanner 206 constantly scans the key pressed/released state of the keyboard 101 illustrated in FIG. 1, and notifies the CPU 201 of a change in state in an interrupting manner The I/O interface 207 constantly scans a switch operation state of the switch panel 102 and the effect module selection panel 103 that are illustrated in FIG. 1, and notifies the CPU 201 of a state in the change in an interrupting manner The LCD controller 208 is an integrated circuit (IC) that controls the display state of the LCD 104.

Each operation position of the six control sliders provided on the effect parameter controller panel 105 in FIG. 1 is converted into a digital value by the A/D converter 205 connected to each of the control sliders. The CPU 201 is notified of the resultant value.

The network interface 219 is connected to, for example, the Internet or a local area network, and can acquire a control program, various pieces of music data, automatic performance data, and the like used in the present embodiment, and store the acquired data in the RAM 203 or the like.

Figure 3A:
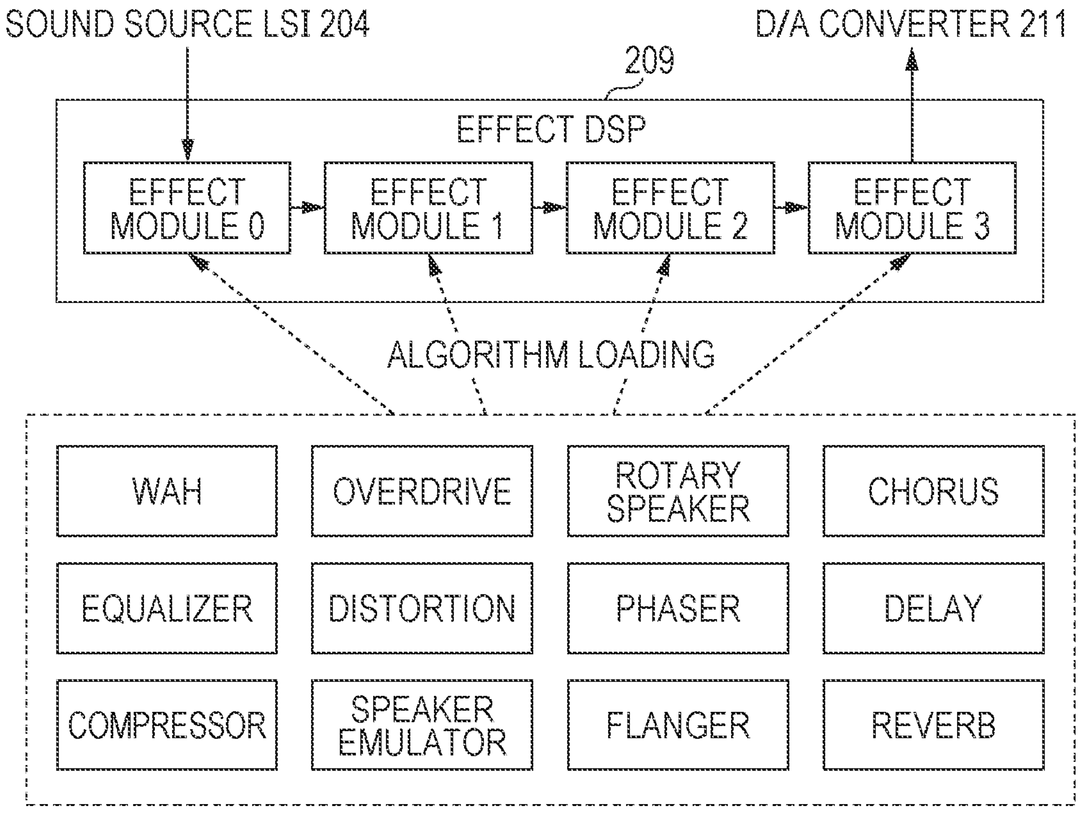
FIGS. 3A-3C are functional block diagrams of an effect DSP.
Figure 3B:
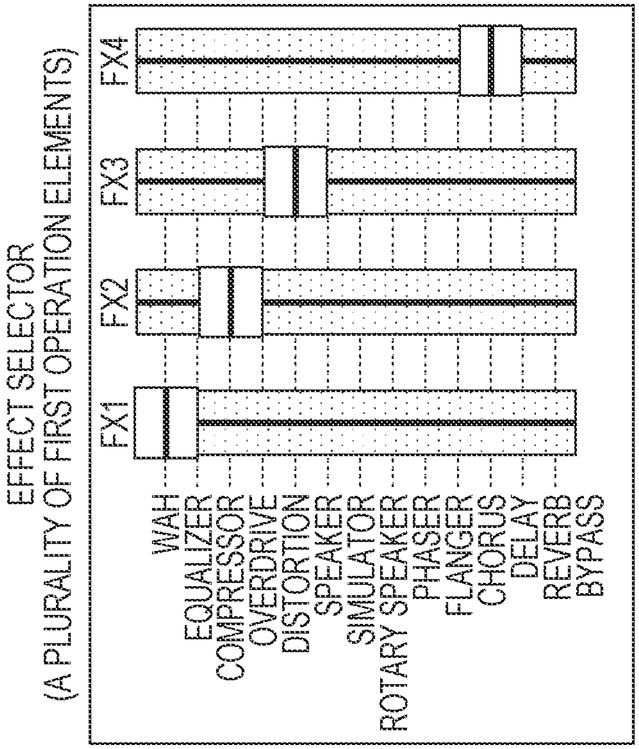
Figure 3C:
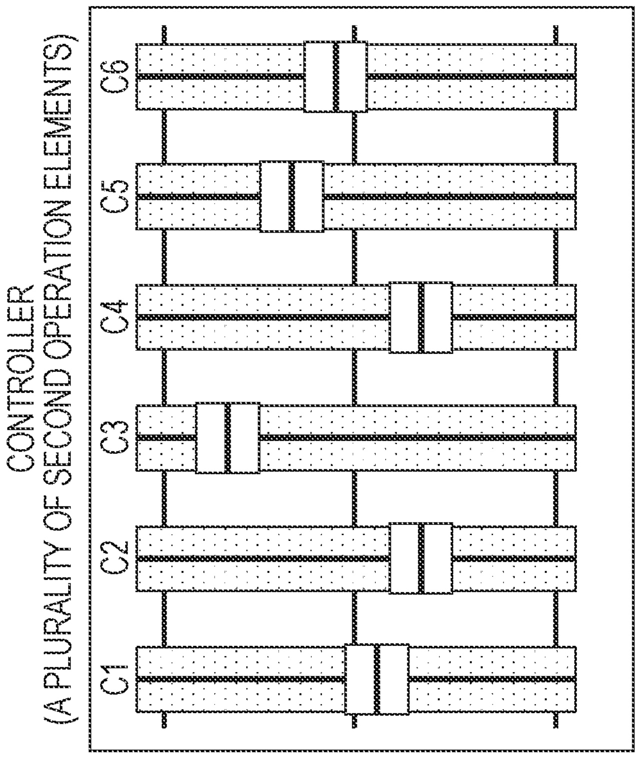

FIGS. 3A-3C are functional block diagrams of the effect DSP 209 illustrated in FIG. 2. The effect DSP 209 receives the musical sound output data output from the sound source LSI 204, and uses a maximum of four effect modules (effect modules 0 to 3) to add a maximum of four types of sound effects in series to the musical sound output data thus received. The resultant output data, that is, musical sound output data with the sound effect added is output to the D/A converter 211 illustrated in FIG. 2. The D/A converter 211 converts the musical sound output data with the sound effect added, received from the effect DSP 209, into an analog musical sound output signal. The analog musical sound output signal is amplified by the amplifier 214 and then is output from the speaker or an output terminal (not illustrated).

As the four effect modules, any of 12 types of effect algorithms illustrated in the lower part of FIG. 3A can be selected. This effect algorithm is program data (or firmware data) for the effect DSP 209 to execute a desired sound effect adding process in each effect module which is an internal signal processing circuit. In each effect module, it is also possible to use a plurality of the same effect algorithms at the same time. When the effect process is not executed in a certain effect module, the musical sound output data input to the effect module directly passes through to be output from the effect module.

<Effect Selection Operation>

Next, an overview of the operation of the present embodiment will be described. The effect module selection panel 103 is located at the right end of the electronic keyboard instrument 100 illustrated in FIG. 1. As illustrated in FIG. 3B, the effect module selection panel 103 includes four slider switches FX1, FX2, FX3, and FX4. When the user sets each of the slider switches FX1, FX2, FX3, and FX4 to a position corresponding to any one of a plurality of effect names described on the left side of the panel, the CPU 201 in FIG. 2 reads each set position via the I/O interface 207. Then, the CPU 201 loads, from the ROM 202, each of the effect algorithms (any of the 12 types illustrated in FIG. 3A) corresponding to the respective set positions, onto a program region on the DSP RAM 210 for a corresponding one of the effect modules 0 to 3 in the effect DSP 209.

FIG. 3B illustrates an example where the effect algorithms with the following respective effect names are assigned to the slider switches FX1 (effect module 0), FX2 (effect module 1), FX3 (effect module 2), and FX4 (effect module 3) on the effect module selection panel 103.

FX1 (effect module 0): WAH
FX2 (effect module 1): COMPRESSOR
FX3 (effect module 2): DISTORTION
FX4 (effect module 3): DELAY For an effect module to have no effect assigned thereto, “BYPASS” may be selected on the corresponding slider switch.

<Control on Effect Parameter>

The effect parameter controller panel 105 is located at the left end of the electronic keyboard instrument 100 in FIG. 1. As illustrated in FIG. 3C, the effect parameter controller panel 105 includes six control sliders C1, C2, . . . , and C6. For each of the six parameters, the user can change the value based on the position of a corresponding one of the control sliders C1, C2, . . . , and C6 (with the value increasing toward the farther side and decreasing toward the closer side).

<Effect Parameter Table>

In this embodiment, some types of attribute information are provided for each of the parameters of all the effect modules to solve the problem described above in “Problems to be Solved by the Invention”. The attribute information is held as data in an “effect parameter table” in the ROM 202 illustrated in FIG. 2. In this effect parameter table, parameter group information is collectively stored for each of the 12 effect algorithm types 0 to 11 of the 12 types of effects described above with reference to FIG. 3A. An “effect type number” is assigned to each of the 12 effect algorithm types. The effect parameter table stores “effect name” and “number of parameters” for each of the effect algorithms with the effect type numbers. For each of a plurality of parameters for each effect algorithm identified by the effect type number, the effect parameter table stores, information including “parameter number”, “parameter name”, “function”, “value range”, “significance”, and “pairing parameter number (pairing parameter information defining a pair of parameters)”. FIGS. 4 to 9 are diagrams illustrating examples of data structures of effect parameter tables corresponding to 12 types of effect algorithms The significance is basic information for selecting a parameter to be assigned to the slider controller of the effect parameter controller panel 105 from all the effects selected at a certain point in time. Here, the significance is different from a value that can compare parameters only in a single effect, but is a value that can compare parameters across a plurality of effects. One effect corresponds to more than one parameters. For example, a case where four effects are selected at a certain point of time will be described. The following four effects are selected: a first effect (the number of parameters is 3), a second effect (the number of parameters is 9), a third effect (the number of parameters is 7), and the fourth effect (the number of parameters is 5). Thus, these four effects have a total of 24 parameters. Here, it is assumed that the effect parameter controller panel 105 has six slider controllers. This significance is used as basic information for deciding which of the 24 parameters is to be assigned to the six slider controllers.

The pairing parameter number is a number designating, when the parameter including the number is assigned to a slider controller of the effect parameter controller panel 105, a parameter number of another parameter to be paired with the parameter and assigned to the slider controller. The present embodiment is not assumed to be applied to cases where two or more parameters need to be paired, and thus only a single parameter number is stored as the pairing parameter number. For a parameter requiring no pairing, a value “−1” is stored. In the data configuration examples of the effect parameter tables in FIGS. 4 to 9, the reason why the parameter of the pairing parameter number is paired in the item is described in “pairing reason”. It should be noted that this is for the sake of explanation, and this item does not exist in the actual effect parameter table. It should be further noted that the effect parameter table may include this item, and this item may be displayed together with the items such as the effect name, the parameter name, and the function, to display information on the parameter set to the effect parameter controller panel 105 on the LCD 104.

<Change of Parameter Assignment>

The parameter is assigned to each slider controller of the effect parameter controller panel 105, when the effect module of the effect module selection panel 103 is exchanged. Here, the LCD 104 illustrated in FIG. 1 displays which parameter is assigned to each slider controller.

The parameter assignment according to the present embodiment is automatically implemented in accordance with the following rules.

Rule 1: Selection Based on Significance

First of all, as the basic rule of Rule 1, the values of significance of all parameters of the effect currently selected on the effect module selection panel 103 are compared with each other, and seven parameters with the largest values are selected in descending order. The seventh parameter serves as a substitute to be promoted in a later described case.

When there is a plurality of parameters of the same value, the priority level is determined based on the following rules.

Rule 1-1: The parameter of the effect module more on the downstream side is more prioritized.

Rule 1-2: When parameters with the same score are found in the same effect, the one with the larger parameter number is prioritized.

No parameter is assigned to a slider controller with a large number when no effect module is selected or when a certain effect module is selected but a sum of the numbers of all the parameters is smaller than five.

Rule 2: Selection Based on Pairing

Whether the pairing parameter number is set is checked for six parameters with the highest priorities selected by Rule 1 described above in descending order of the priority level. It is a matter of course that the parameter to be paired that is set as the pairing parameter number is a parameter in an effect module that is the same as that including the parameter having the pairing parameter number set.

When a pairing parameter number is set for the N-th ($1 \leq N \leq 6$) parameter, the following process is executed.

Rule 2-1: No change is made when the parameter of the pairing parameter number is already included to be at any of the positions (X-th ($0 \leq X \leq 5$)).

Rule 2-2: When N=6, there is no room for adding the parameter of the pairing parameter number. Thus, the parameter with the pairing parameter number is eliminated to be substituted by the parameter with the seventh priority level. When the parameter with the seventh priority also has a pairing parameter number, the parameter is also eliminated, resulting in the sixth slider controller C6 being vacant.

Rule 2-3: When Rule 2-1 or Rule 2-2 described above does not apply, the parameter with the pairing parameter number is inserted to have an (N+1)th priority level, and the parameter with the sixth priority is demoted to be the seventh (substitute) parameter, and the parameter that used to be the seventh (substitute) parameter is eliminated.

Rule 3: Sort by Order of Effect Module

The remaining parameters with the six highest priority levels are rearranged from the top in the order of the effect modules and the order of the parameter number.

The six parameters finally determined according to the Rules 1 to 3 described above are assigned to the slider controllers C1 to C6 on the effect parameter controller panel 105 illustrated in FIG. 1.

Figure 10:
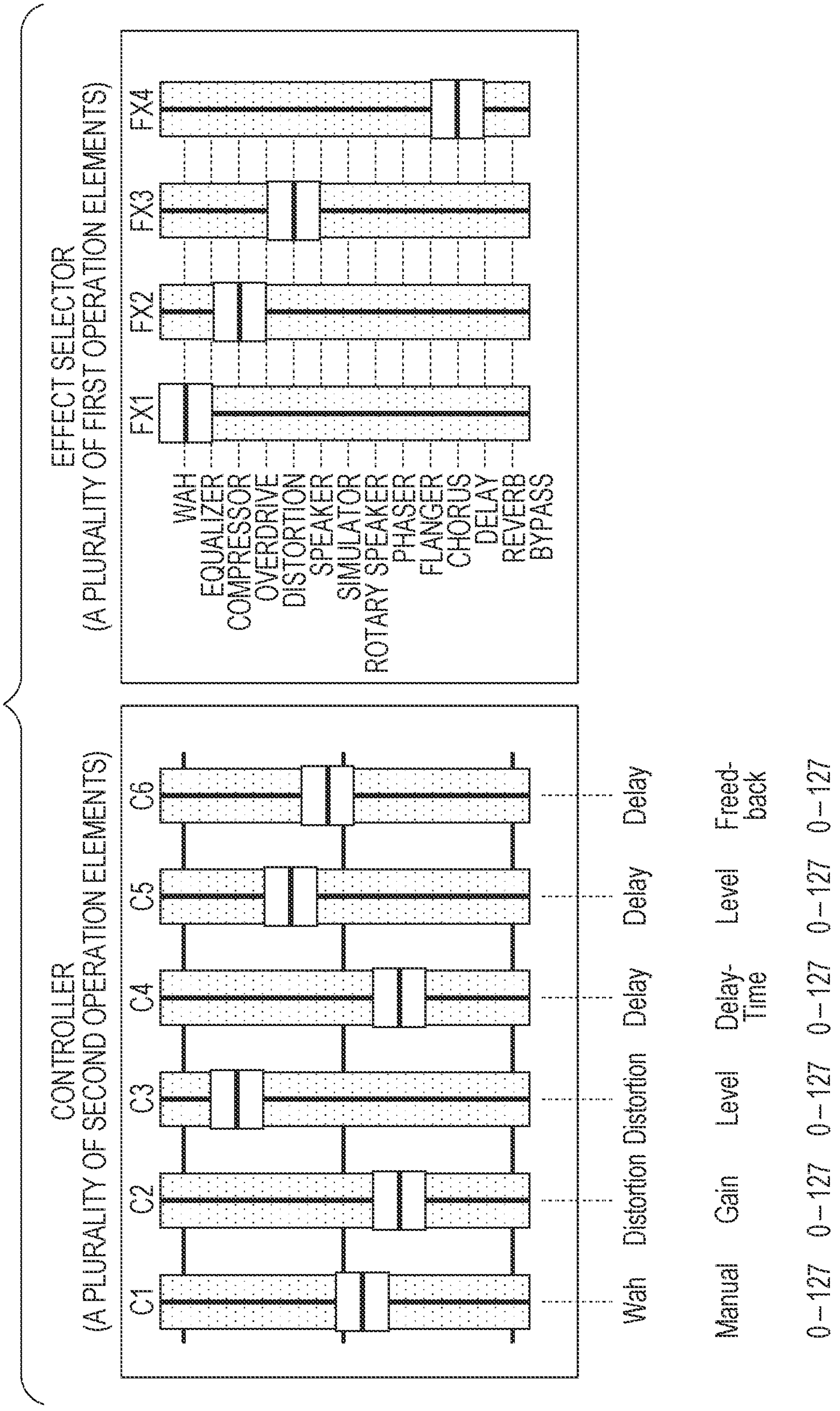
FIG. 10 illustrates an example of effect selection on an effect module selection panel and an example of corresponding parameter assignment to slider controllers of an effect parameter controller panel.

FIG. 10 illustrates an example of effect selection on the effect module selection panel 103 and an example of corresponding parameter assignment to the slider controllers C1 to C6 of the effect parameter controller panel 105 determined based on Rules 1 to 3.

In this example, first of all, on the effect module selection panel 103, the following effects are selected: WAH (effect type number=0); COMPRESSOR (effect type number=2); DISTORTION (effect type number=10); and DELAY (effect type number=10). Next, in the effect parameter tables in FIGS. 4, 6, and 9, the following seven parameters are selected among the parameters corresponding to the selected effect type numbers, in descending order of value of significance based on Rule 1.

Priority level 1: Parameter number=1 (Manual) corresponding to Effect type number=0 (WAH)

Priority level 2: Parameter number=0 (Delay Time) corresponding to Effect type number=10 (DELAY)

Priority level 3: Parameter number=0 (Gain) corresponding to Effect type number=4 (DISTORTION)

Priority level 4: Parameter number=3 (Level) corresponding to Effect type number=10 (DELAY)

Priority level 5: Parameter number=1 (Delay Level) corresponding to Effect type number=10 (DELAY)

Priority level 6: Parameter number=2 (Feedback) corresponding to Effect type number=10 (DELAY)

Priority level 7: Parameter number=3 (Level) corresponding to Effect type number=4 (DISTORTION)

Next, the results of applying Rule 1 described above on the effect parameter tables in FIGS. 4, 6, and 9 are checked in order from the parameter with the high priority level, to find one with the paring parameter number set according to Rule 2. As a result, the parameter number=0 (Gain) of the effect type number=4 (DISTORTION) with the priority level 3 is detected to have the pairing parameter number=3 set. As a result, the parameter "Level" of the parameter number=3 of the effect type number=4 (DISTORTION) is set to the priority level 4. Then, the parameter with the priority level 7 is eliminated, and the parameters with the priority levels 4 to 6 are demoted to have priority levels 5 to 7.

After Rules 1 and 2 have been applied as described above, Rule 3 is applied so that the parameters with the final priority levels 1 to 6 are sorted in the order of the effect type numbers corresponding to the effect modules selected on the effect module selection panel 103. As a result, the following six parameters are assigned to the slider controllers C1 to C6 on the effect parameter controller panel 105, as illustrated in a lower part of FIG. 10B. Furthermore, the value ranges corresponding to the parameter numbers set in the effect parameter tables illustrated in FIGS. 4, 6, and 9 are set.

C1: WAH Manual, value range: 0 to 127

C2: DISTORTION Gain, value range: 0 to 127

C3: DISTORTION Level, value range: 0 to 127

C4: DELAY Delay Time, value range: 0 to 127

C5: DELAY Level, value range: 0 to 127

C6: DELAY Delay level, value range: 0 to 127

Figure 11:
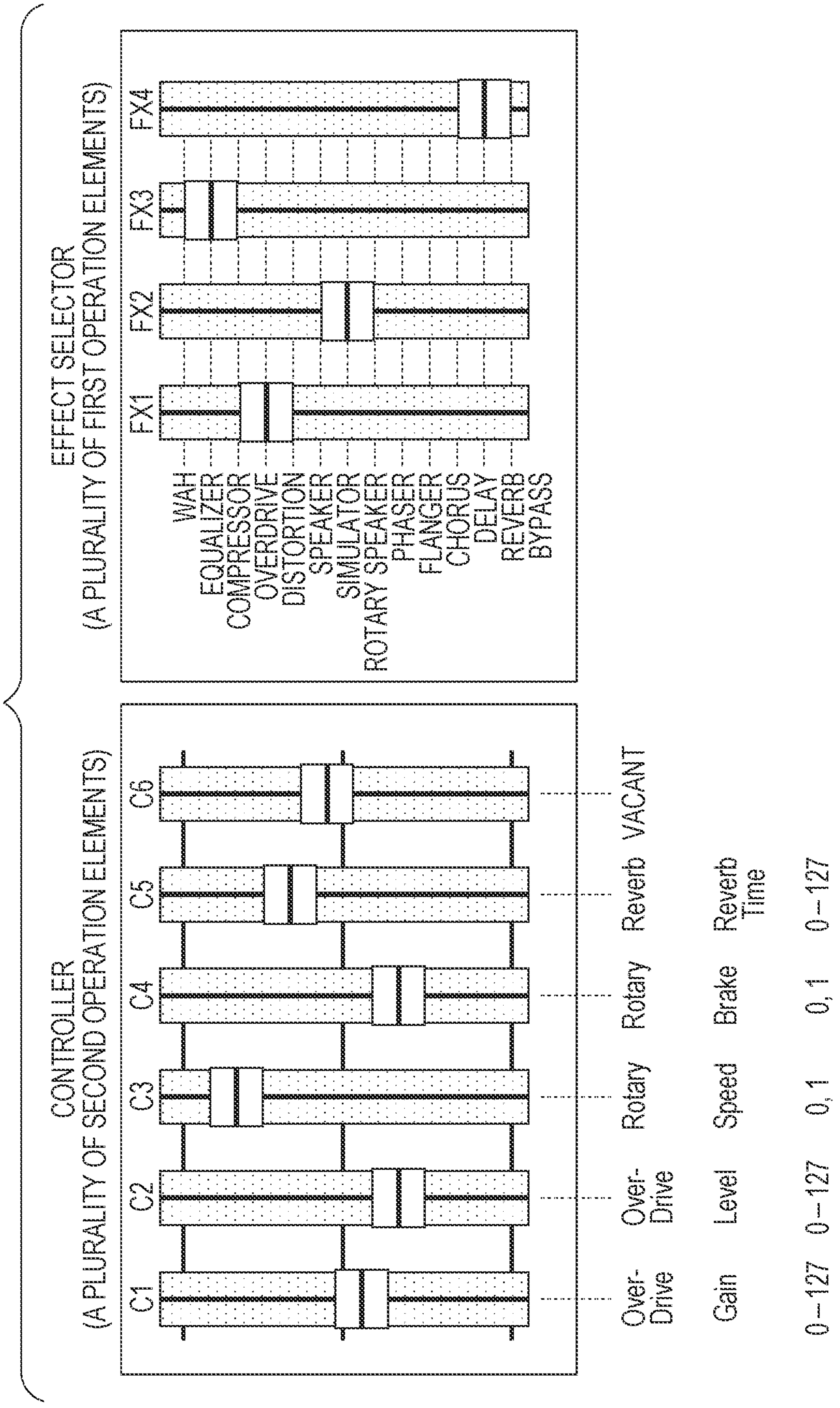
FIG. 11 illustrates another example of effect selection on an effect module selection panel and an example of corresponding parameter assignment to slider controllers of an effect parameter controller panel.

FIG. 11 illustrates another example of effect selection on the effect module selection panel 103 and an example of corresponding parameter assignment to the slider controllers C1 to C6 of the effect parameter controller panel 105 determined based on Rules 1 to 3.

In this example, first of all, on the effect module selection panel 103, the following effects are selected: OVERDRIVE (effect type number=3), ROTARY SPEAKER (effect type number=6), EQUALIZER (effect type number=1), and REVERB (effect type number=11). Next, in the effect parameter tables in FIGS. 5, 6, 7, and 9, the following seven parameters are selected among the parameters corresponding to the selected effect type numbers, in descending order of value of significance according to Rule 1.

Priority level 1: Parameter number=1 (Speed) corresponding to Effect type number=6 (ROTARY SPEAKER)

Priority level 2: Parameter number=1 (Reverb Time) corresponding to Effect type number=11 (REVERB)

Priority level 3: Parameter number=2 (Brake) corresponding to Effect type number=6 (ROTARY SPEAKER)

Priority level 4: Parameter number=0 (Gain) corresponding to Effect type number=3 (OVERDRIVE)

Priority level 5: Parameter number=0 (EQ1 Frequency) corresponding to Effect type number=1 (EQUALIZER)

Priority level 6: Parameter number=0 (Reverb Time) corresponding to Effect type number=11 (REVERB)

Priority level 7: Parameter number=0 (Gain) corresponding to Effect type number=3 (OVERDRIVE)

Next, the results of applying Rule 1 described above on the effect parameter tables in FIGS. 5, 6, 7, and 9 are checked in order from the parameter with the high priority level, to find one with the paring parameter numbers set according to Rule 2. As a result, the parameter number=0 (Gain) of the effect type number=3 (OVERDRIVE) with the priority level 4 is detected to have the pairing parameter number=2 set. As a result, the parameter "Level" of the parameter number=2 of the effect type number=3 (OVERDRIVE) is set to the priority level 5. Then, the parameter with the priority level 7 is eliminated, and the parameters with the priority levels 5 and 6 are demoted to have priority levels 6 and 7. The parameter promoted to have the new priority level 6 also has the pairing parameter number set. This parameter is deleted due to Rule 2-2 described above. As a result, the parameter with the priority level 7 is promoted only to be also deleted according to Rule 2-2. As a result, the priority level 6 will be vacant.

After Rules 1 and 2 have been applied as described above, Rule 3 is applied so that the parameters with the final priority levels 1 to 6 are sorted in the order of the effect module numbers corresponding to the effect modules selected on the effect module selection panel 103. As a result, the following six parameters are assigned to the slider controllers C1 to C6 on the effect parameter controller panel 105, as illustrated in a lower part of FIG. 11B. Furthermore, the value ranges corresponding to the parameter numbers set in the effect parameter tables illustrated in FIGS. 5, 6, 7, and 9 are set.

C1: OVERDRIVE Gain, value range: 0 to 127

C2: OVERDRIVE Level, value range: 0 to 127

C3: ROTARY SPEAKER Speed, value range: 0 or 1

C4: ROTARY SPEAKER Brake, value range: 0 or 1

C5: REVERB Reverb Time, value range: 0 to 127

C6: Vacant

<Software Processing>

The parameters required for software control and the detailed software operation based on a flowchart will be described below.

<Variables>

FIG. 12A illustrates an example of a data structure of an "effect module-effect type table" in which respective effect type numbers selected for the effect modules 0 to 3 (see FIG. 3A) in the effect DSP 209 are stored based on a user operation on the effect module selection panel 103 illustrated in FIG. 1. FIG. 12B illustrates an example of a data structure of a "controller-parameter assignment variable table" that stores a status of assignment of parameters of the slider controllers C1 to C6 of the effect parameter controller panel 105 illustrated in FIG. 1 by the user. Each data in the effect module-effect type table and the controller-parameter assignment variable table is stored in, for example, the RAM 203 illustrated in FIG. 2.

The effect module-effect type table illustrated in FIG. 12A is stored in the RAM 203 as array data ModType[i] ($0 \le i \le 3$). Thus, the values of the effect type numbers corresponding to the variables i ($0 \le i \le 3$) stored in the RAM 203 and indicating the effect module numbers 0 to 3 (see FIG. 3A) are stored for ModType[i] as array values. Note that ModType[i]=−1 indicates that no effect type number is assigned to the effect module i.

The controller-parameter assignment variable table illustrated in FIG. 12B is stored on the RAM 203 as array data group CtrlValid[j], CtrlMod[j], CtrlType[j], CtrlParm[j], CtrlSig[j], and CtrlPair[j] ($0 \le j \le 6$ holds true for all these). The variable j that is stored in the RAM 203 and indicates a control slider includes: variables j=0 to 5 corresponding to the control sliders C1 to C6 (see FIG. 3B); and the variable j=6 used as a storage area for the substitute control slider according to Rule 1. The array data CtrlValid[j] stores a value indicating whether the slider controller indicated by the variable j is valid (=1) or invalid (=0). The array data CtrlMod[j] stores values 0 to 3 indicating which of the parameters controlled using the slider controller indicated by the variable j is used for controlling which of the effect modules 0 to 3 (see FIG. 3A) in the effect DSP 209. The array data CtrlType[j] indicates the effect type number to which a parameter assigned to the slider controller indicated by the variable j belongs. When a parameter is assigned, the effect type number set for the parameter in the effect parameter tables illustrated as an example in FIGS. 4 to 9 is stored in the data. The array data CtrlParm[j] indicates the effect parameter number corresponding to a parameter assigned to the slider controller indicated by the variable j. When a parameter is assigned, the effect parameter number set for the parameter in the effect parameter tables illustrated as an example in FIGS. 4 to 9 is stored in the data. The array data CtrlSig[j] indicates the significance of a parameter assigned to the slider controller indicated by the variable j. When a parameter is assigned, the significance of the parameter in the effect parameter tables illustrated as an example in FIGS. 4 to 9 is stored in the data. The array data CtrlPair[j] indicates a pairing parameter number of a parameter assigned to the slider controller indicated by the variable j. When a parameter is assigned, the paring parameter number set for the parameter in the effect parameter tables illustrated as an example in FIGS. 4 to 9 is stored in the data. In each array data CtrlMod[j], CtrlType[j], CtrlParm[j], CtrlSig[j], or CtrlPair[j] described above, an invalid value "−1" is stored when it is not used.

Figure 13:
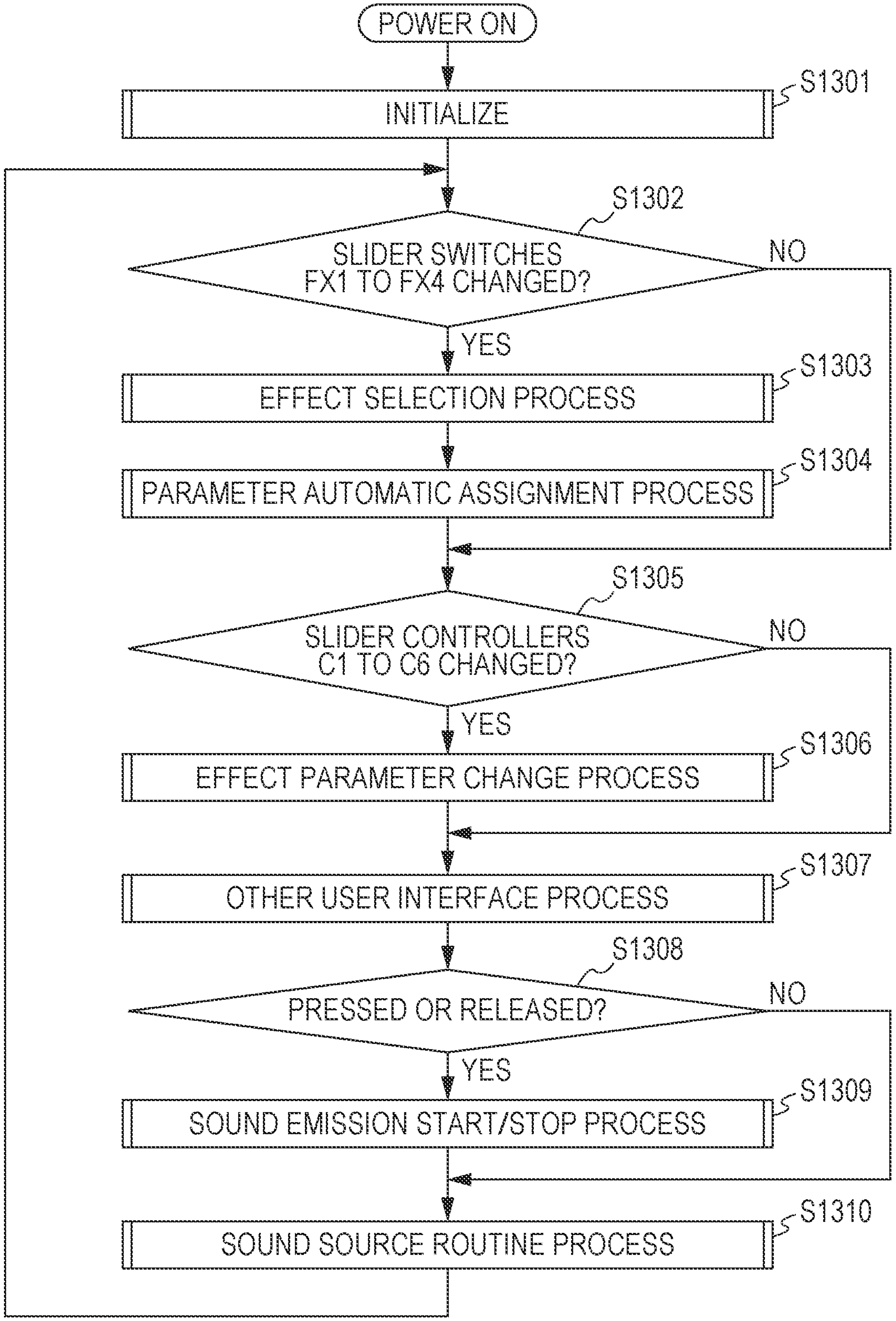
FIG. 13 is a main flowchart illustrating an example of a process of controlling the electronic musical instrument according to the present embodiment.

FIG. 13 is a main flowchart illustrating an example of a process of controlling the electronic musical instrument 100 according to the present embodiment. This control processing is, for example, an operation implemented with the CPU 201 illustrating in FIG. 2 executing the control process program loaded from the ROM 202 onto the RAM 203.

When the power of the main body of the electronic keyboard instrument 100 is turned on, an initialization process for the contents of the RAM 203 and the like is executed (step S1301), and then the process enters an infinite loop for repeatedly executing a series of processes from steps S1302 to S1310. The processes executed in this infinite loop are classified into the following four types.

<Effect Selection Process: Steps S1302 to S1304>

The CPU 201 determines whether the position of any of the slider switches FX1, FX2, FX3, or FX4 on the effect module selection panel 103 in FIG. 1 has changed via the I/O interface 207 in FIG. 2 (step S1302). When the result of this determination is NO, the CPU 201 proceeds to the control in step S1305.

When the result of the determination in step S1302 is YES, the CPU 201 first executes an effect selection process (step S1303). In this process, the CPU 201 reflects, on the effect module-effect type table on the RAM 203 described with reference to FIG. 12A, correspondence relationship between the effect type number corresponding to the new apparatus position of the slider switch that has been changed and the effect module number corresponding to the slider switch with the change.

After the process in step S1303, the CPU 201 executes a parameter automatic assignment process (step S1304). This process is a process of automatically assigning parameters to the respective slider controllers on the effect parameter controller panel 105 in response to a change in the effect made by the user by operating a slider switch on the effect module selection panel 103. This process will be described in detail later with reference to the flowcharts of FIGS. 14A-14C.

<Slider Controller Process>

After the processes in the above steps S1302 to S1304, the CPU 201 determines whether the slider position of any of the six slider controllers C1 to C6 on the effect parameter controller panel 105 illustrated in FIG. 1 has been changed, via the A/D converter 205 illustrated in FIG. 2 (step S1305). When the result of this determination is NO, the CPU 201 proceeds to the control in step S1307.

When the result of the determination in step S1305 is YES, the CPU 201 executes an effect parameter change process (step S1306). In this processing, the CPU 201 refers to the controller-parameter assignment variable table illustrated in FIG. 12B stored on the RAM 203, to acquire the effect module number and the effect parameter number corresponding to the slider controller with the change. Then, the CPU 201 issues an instruction to the corresponding effect module in the effect DSP 209, to change the value of the corresponding parameter to the value of the slider controller detected in step S1305. Thus, a sound effect addition state is changed in the corresponding effect module.

<Other User Interface Process>

After the processes in steps S1305 and S1306, the CPU 201 reads the operation state of the switch panel 102 in FIG. 1 via the I/O interface 207, displays the operation state on the LCD 104 via the LCD controller 208, and performs other user interface processes (step S1307).

<Sound Source Process>

After the process in step S1307, the CPU 201 reads, via the key scanner 206, whether or not any key on the keyboard 101 has been pressed or released (step S1308).

When it is determined that no key pressing or releasing has been performed, the CPU 201 proceeds to the control in step S1310. When it is determined key pressing or releasing has been performed, the CPU 201 instructs the sound source LSI 204 to start or stop musical sound emission (step S1309).

After the process in step S1308 or S1309, the CPU 201 executes a sound source routine process (step S1310). In this process, the CPU 201 controls the sound source LSI 204 for continuous control, such as changing the envelope of the musical sound being emitted.

Figure 14A:
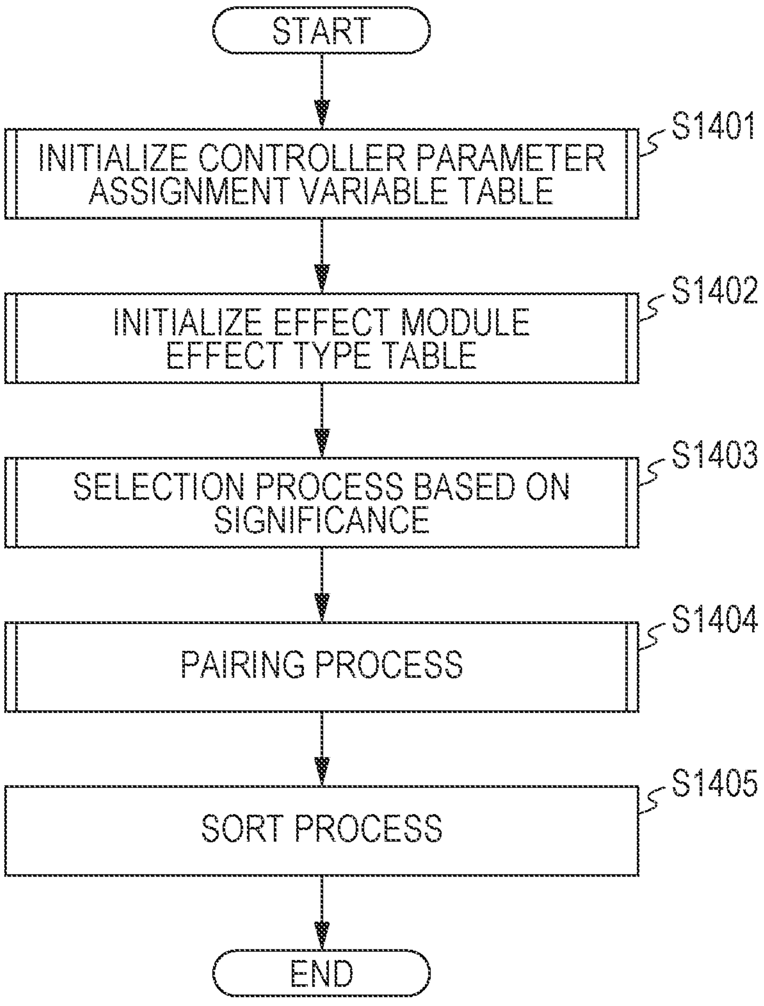
FIGS. 14A-14C are flowcharts respectively illustrating a parameter automatic assignment process, a detailed example of a controller-parameter assignment variable table initialization process, and a detailed example of an effect module-effector type table initialization process.

FIG. 14A is a flowchart illustrating a detailed example of the parameter automatic assignment process in step S1304 in FIG. 13. Here, the process of executing the <parameter assignment change> will be described in detail, as a process executed using the controller-parameter assignment variable table stored on the RAM 203 and described above with reference to FIG. 12B.

Figure 14B:
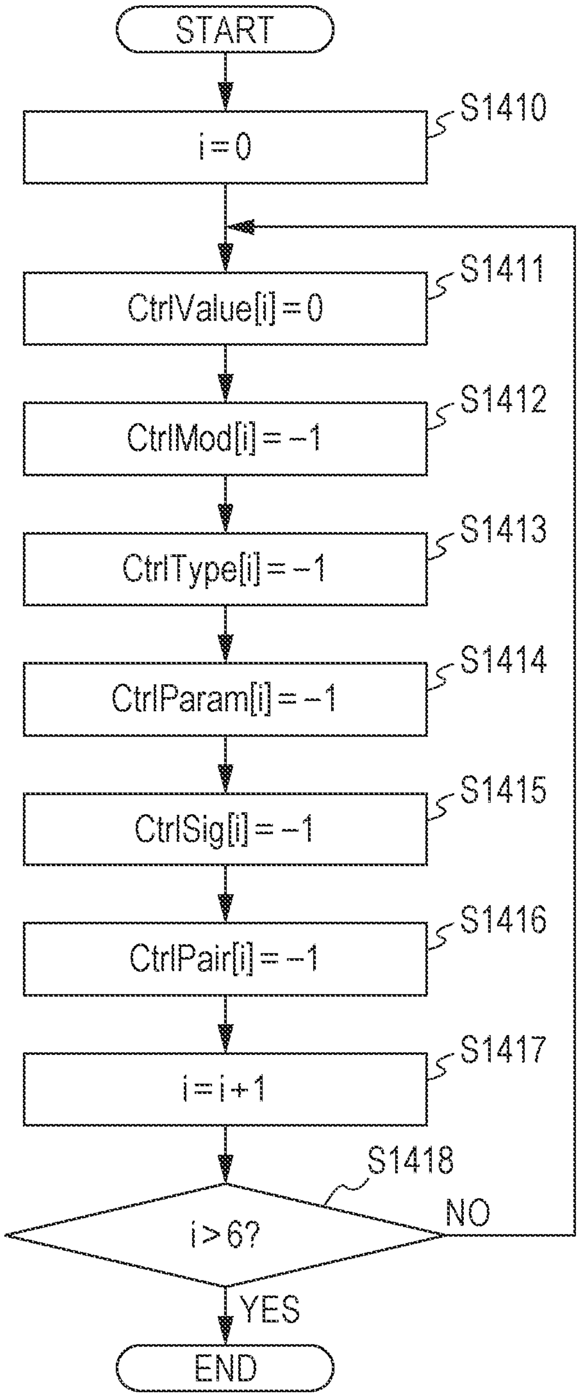

First of all, the CPU 201 initializes the contents of the controller-parameter assignment variable table stored on the RAM 203 (step S1401). FIG. 14B is a flowchart illustrating a detailed example of step S1401. In this flowchart, after initially setting the value of the variable i to 0 (step S1410), the CPU 201 repeats a series of processes in step S1411 to S1416 while changing the value of the variable i from 0 to 5 by incrementing the value 1 at a time (steps S1417 and S1418). Thus, the processes are executed for each of the controller internal numbers (see FIG. 12B) corresponding to all the slider controllers C1 to C6 and to the substitute slider controller corresponding to the set value of the variable i. Thus, in step S1411, the CPU 201 stores the invalid value "0" in the array data CtrlValid[i] corresponding to the slider controller indicated by the variable i. In steps S1412 to S1416, the CPU 201 stores the invalid value "−1" in each of the pieces of array data CtrlMod[i], CtrlType[i], CtrlParm[i], CtrlSig[i], and CtrlPair[i] corresponding to the slider controller indicated by the variable i.

Figure 14C:
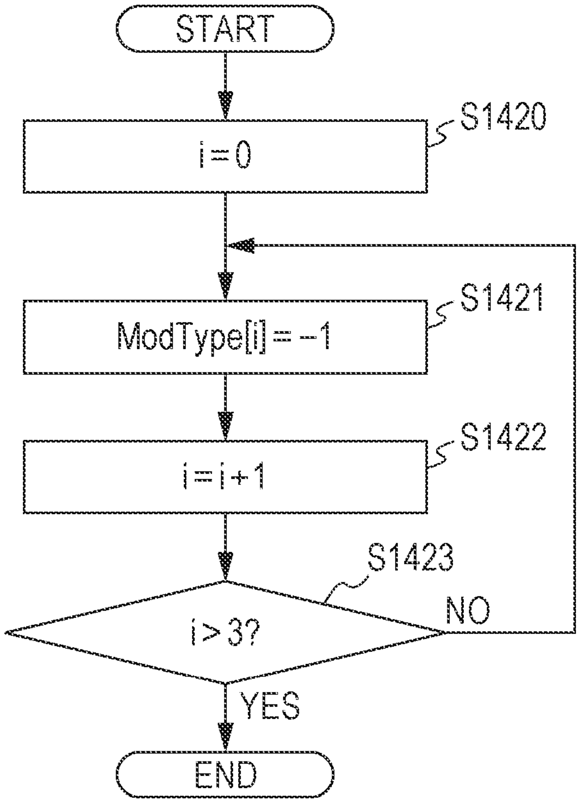

Next, the CPU 201 initializes the contents of the effect module-effect type table stored on the RAM 203 (step S1402). FIG. 14C is a flowchart illustrating a detailed example of step S1402. In this flowchart, the CPU 201 that has initialized the value of the variable i to 0 (step S1420) repeats the process in step S1421 while changing the value of the variable i from 0 to 3 by incrementing the value 1 at a time (steps S1422 and S1423). Thus, the process is executed for each of the effect modules corresponding to the set value of the variable i. Thus, in step S1421, the CPU 201 stores the invalid value "−1" in the array data ModType[i] corresponding to the effect module indicated by the variable i.

Figure 15:
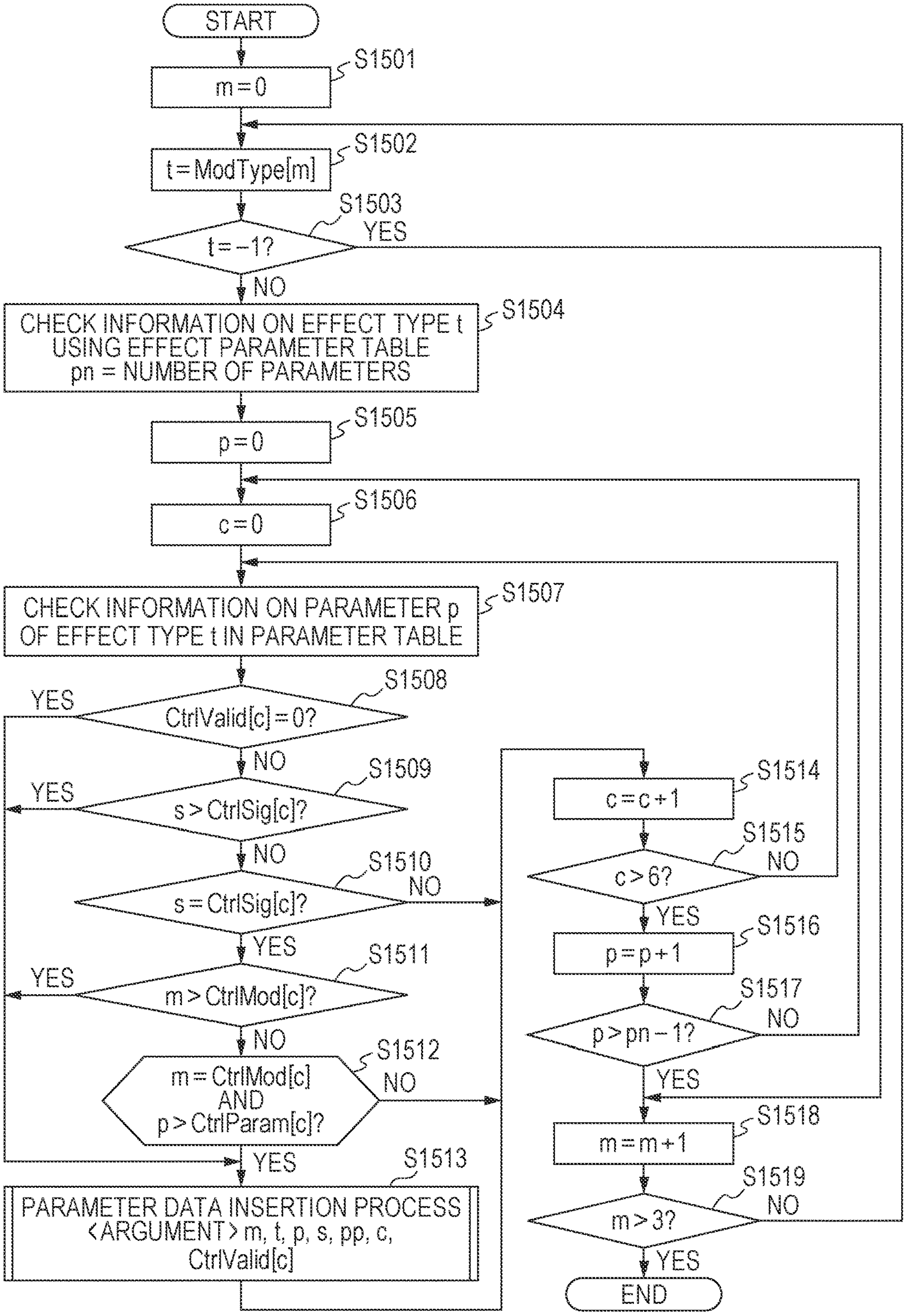
FIG. 15 is a flowchart illustrating a detailed example of a selection process based on significance.

After the initialization processes in steps S1401 and S1402 described above, the CPU 201 executes a selection process based on significance (step S1403). FIG. 15 is a flowchart illustrating a detailed example of the selection process based on significance in step S1403. This flowchart corresponds to the specific process based on "Rule 1: Selection based on significance" described above.

In the flowchart in FIG. 15, the CPU 201 first initializes a value of a variable m on the RAM 203 indicating each effect module to 0 in step S1501, and then repeatedly executes an operation of incrementing the value 1 at a time in step S1518, until the value is determined to have exceeded the value 3 corresponding to the last module in step S1519. For each of the effect modules (hereinafter, referred to as effect module m) designated by the values of the variable m, the CPU 201 executes a series of processes from step S1502 to step S1517 described below. Thus, as described above with reference to FIG. 3A, three effect modules 0 to 3 are designated one by one as the effect module m.

In a series of processes from step S1502 to step S1517, the CPU 201 first refers to the ModType[m] stored on the RAM 203 as the array data which is the effect module-effect type table (see FIG. 12B) based on the value of the variable m, to acquire the effect type number corresponding to the effect module m, and sets this number to be a variable t on the RAM 203 (step S1502). Hereinafter, this effect type number will be referred to as an effect type number t.

Next, the CPU 201 determines whether or not the value of the effect type number t is the invalid value "−1" (step S1502). When the result of the determination in step S1502 is YES, the CPU 201 proceeds to step S1518 without executing the processes in step S1504 and after on the current effect module m. In step S1518, the value of the variable m is incremented. Thus, the CPU 201 proceeds to a process corresponding to the next effect module m referred using the variable m thus incremented.

When the result of the determination in step S1502 is NO (the value of the effect type number t is not an invalid value), the CPU 201 acquires the number of parameters from the entries corresponding to the effect type number t on the effect parameter tables (see FIGS. 4 to 9) stored on the RAM 203, and sets this to be a variable pn on the RAM 203 (step S1504). Hereinafter, this number of parameters will be referred to as a number of parameters pn.

Next, for each effect corresponding to the effect module m and the effect type number t, the CPU 201 initializes the value of the variable p on the RAM 203 for indicating each parameter corresponding to the effect to 0 in step S1505. Then, the CPU 201 repeatedly executes an operation of incrementing the value 1 at a time in step S1516 until the value is determined to have exceeded the value=the number of parameters pn−1 corresponding to the last parameter in step S1517. Thus, the CPU 201 executes a series of processes in S1506 to S1515 described below for each of the parameter (hereinafter referred to as a parameter p) designated by each value of the variable p. As illustrated in the example illustrated in FIGS. 4 to 9, as the parameter p, pn parameters from a parameter 0 to a parameter pn, corresponding to the number of parameters pn extracted in step S1504 for the effect type number t, are designated one by one.

In a series of processes from step S1506 to step S1515, for each effect corresponding to the effect module m and the effect type number t and for each parameter p in the effect, the CPU 201 initializes a value of a variable c on the RAM 203 indicating each of the slider controllers on the effect parameter controller panel 105 to be a target of comparison to 0 in step S1506. Then, the CPU 201 repeatedly executes the operation of incrementing the value 1 at a time in step S1514, until the value is determined to have exceeded the value 6 (see the controller internal number in FIG. 12A) corresponding to the last slider controller in step S1515. Thus, the CPU 201 executes a series of processes in step S1507 to S1513 for each of the slider controllers (hereinafter, referred to as a slider controller c) designated by a corresponding value of the variable c. As the slider controller c, seven slider controllers including a slider controller 0 (=C1) to a slider controller 5 (=C6) and a slider controller 6 (=substitute), as illustrated as an example in FIG. 12A, are designated one by one.

In a series of processes from step S1507 to step S1513, the CPU 201 performs the determination based on Rule 1 described above, on the slider controllers 0 to 5 (=C1 to C6) and on the slider controller 6 (=substitute), for each effect corresponding to the effect module m and the effect type number t and for each parameter p in the effect.

In the determination based on Rule 1, the CPU 201 first acquires information corresponding to the effect type number=t and the parameter number=p from the effect parameter tables (see FIGS. 4 to 9), and stores the values of the significance and the pairing parameter number thus acquired as variables s and pp respectively, on the RAM 203 (step S1507).

Next, the CPU 201 refers to the controller-parameter assignment variable table (see FIG. 12A) to acquire the values of the array data CtrlValid[c], CtrlSig[c], CtrlMod[c], and CtrlParam[c], and executes determination processes in the following steps S1508 to S1512.

First of all, the CPU 201 determines whether the array data value CtrlValid[c], serving as a validity flag, is 0, that is, whether the slider controller c is invalid (see FIG. 12A) (step S1508). When the result of the determination in step S1508 is YES (the slider controller c is invalid), the information on the parameter p of the effector corresponding to the effect type number t set in the effect module m can be immediately set to the slider controller c. Thus, the CPU 201 proceeds to a parameter data insertion process in step S1513 for performing such a setting. This parameter data insertion process will be described later in detail with reference to a flowchart in FIG. 19.

When the result of the determination in step S1508 is NO (the slider controller c is valid), the CPU 201 determines whether the array data value CtrlSig[c] indicating the significance of the parameter already set to the slider controller c is smaller than the significance s of the parameter p of the effect corresponding to the effect type number t set to the effect module m (step S1509).

When the result of the determination in step S1509 is YES (the significance s of the parameter p is larger), the CPU 201 proceeds to the process in step S1513 described later to insert the information on the parameter p of the effect corresponding to the effect type number t set to the effect module m, to the slider controller c. This corresponds to the basic rule of Rule 1 described above.

When the result of the determination in step S1509 is NO (the significance s of the parameter p is not larger), the CPU 201 determines whether the array data value CtrlSig[c] indicating the significance of the parameter already set to the slider controller c is equal to the value of the significance s of the parameter p of the effect corresponding to the effect type number t set to the effect module m (step S1510).

When the result of the determination in step S1510 is NO, that is, when the significance s is equal to or smaller than the significance CtrlSig[c], the CPU 201 proceeds to step S1514 without setting the parameter p of the effector corresponding to the effect type number t set to the effect module m to the slider controller c. Thus, the variable c is incremented so that the determination based on comparison using the next slider controller c is performed.

When the result of the determination in step S1510 is YES, the CPU 201 further determines whether the number of the effect module m is larger than the array data value CtrlMod[c] indicating the effector module number already set to the slider controller c. In other words, whether the effect module m is more on the downstream side than the effect module set to the slider controller c is determined (step S1511).

When the result of the determination in step S1511 is YES (the effect module m is more on the downstream side), the CPU 201 proceeds to the process in step S1513 described later to insert the information on the parameter p of the effect corresponding to the effect type number t set to the effect module m, to the slider controller c. This corresponds to Rule 1-1 described above.

When the result of the determination in step S1511 is NO (the effect module m is not more on the downstream side), the CPU 201 further determines whether the number of the effect module m is equal to the array data value CtrlMod[c] indicating the effect module number already set to the slider controller c and whether the parameter number p of the effector corresponding to the effect type number t is larger than the array data value CtrlParam[c] indicating the parameter number already set to the slider controller c (S1512).

When the result of the determination in step S1512 is YES (the parameter number p is larger), the CPU 201 proceeds to the process in step S1513 described later to insert the information on the parameter p of the effect corresponding to the effect type number t set to the effect module m, to the slider controller c. This corresponds to Rule 1-2 described above.

When the result of the determination in step S1512 is NO (when the parameter number p is not larger), the CPU 201 proceeds to step S1514 without setting the parameter p of the effector corresponding to the effect type number t set to the effect module m to the slider controller c. Thus, the variable c is incremented so that the determination based on comparison using the next slider controller c is performed.

Figure 16:
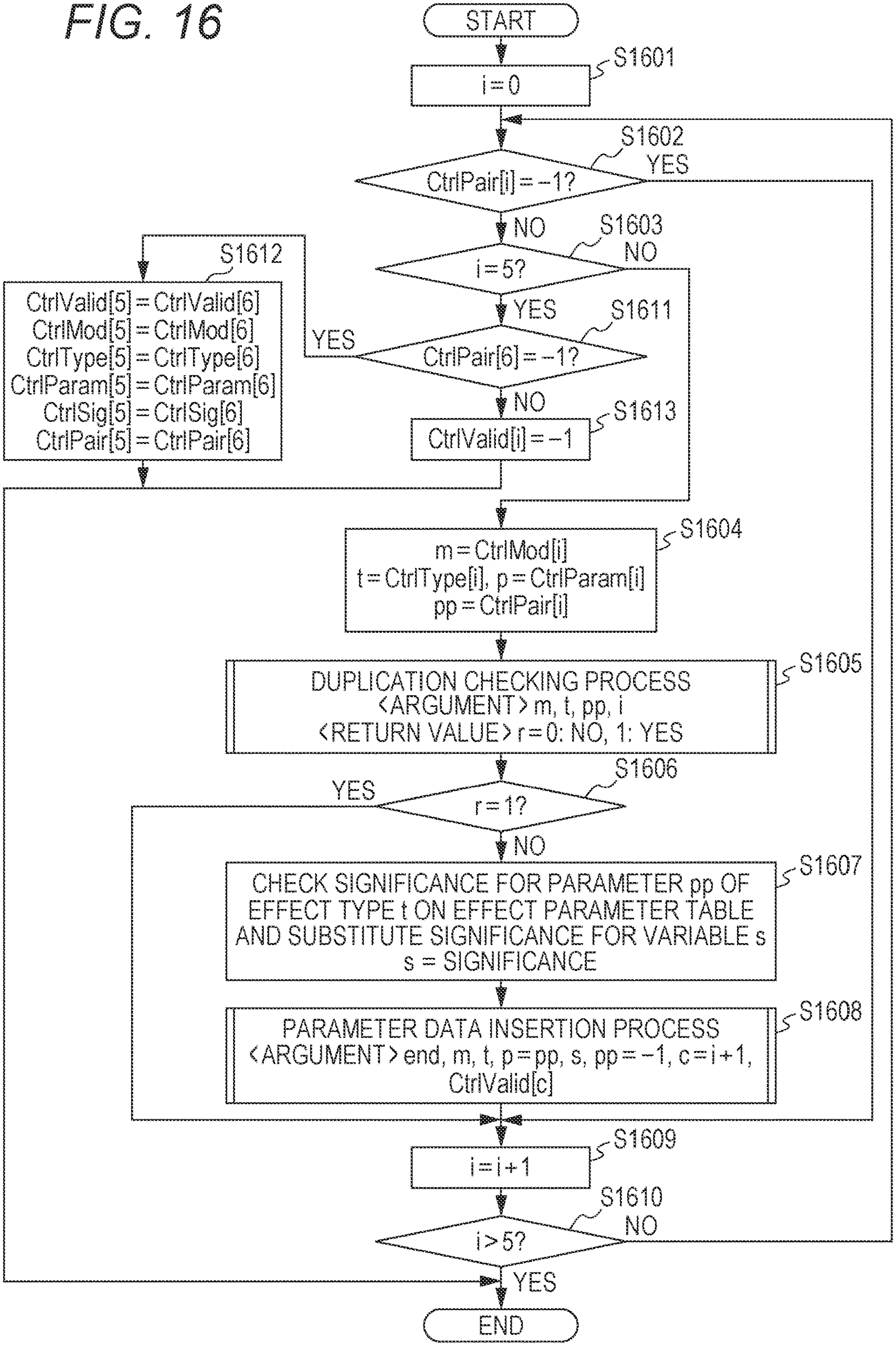
FIG. 16 is a flowchart illustrating a detailed example of a pairing process.

After the process in the flowchart in FIG. 15 thus ends and after the selection process based on significance in step S1403 in the flowchart in FIG. 14A in the parameter automatic assignment process in step S1304 in FIG. 13, the CPU 201 executes a pairing process (step S1404). FIG. 16 is a flowchart illustrating a detailed example of the pairing process in step S1404. This flowchart corresponds to the specific process based on "Rule 2: Selection based on pairing" described above.

In the flowchart of FIG. 16, the CPU 201 first initializes the value of the variable i on the RAM 203 designating each slider controller on the effect parameter controller panel 105 to 0 in step S1601. Then, the CPU 210 repeatedly executes an operation in step S1609 to increment the value 1 at a time, until the value is determined to have exceeded the value 5 (refer to the controller internal number in FIG. 12A) corresponding to the last slider controller before the substitute in step S1610. Thus, the CPU 201 executes a series of processes in step S1602 to S1608 for each of the slider controllers (hereinafter, referred to as a slider controller i) designated by a corresponding value of the variable i. As the slider controller i, six slider controllers including a slider controller 0 (=C1) to a slider controller 5 (=C6) as illustrated in FIG. 12A, are designated one by one.

As a result of the selection process based on significance (Rule 1 described above) in step S1403 in FIG. 14A as illustrated in the flowchart in FIG. 15 described above, the parameter with the highest priority level is assigned to the slider controller 0, followed by the slider controllers 1 to 5 with the priority levels sequentially decreasing. Thus, in a flowchart in FIG. 16, the slider controllers are checked one by one in descending order of the priority level, to find out whether the parameter assigned thereto has the pairing parameter number set.

In a series of processes from steps S1602 to S1608, the CPU 201 first refers to the data in the controller-parameter assignment variable table on the RAM 203 illustrated as an example in FIG. 12A, to determine whether the array data value CtrlPair[i] indicating the pairing parameter number corresponding to parameter assigned to the slider controller i is an invalid value "−1" (step S1602).

When the result of the determination in step S1602 is YES (when the invalid value is set to the pairing parameter number), the CPU 201 proceeds to step S1609 to increment the value of the variable i, and proceeds to the process for the next slider controller i.

When the result of the determination in step S1602 is NO (when the pairing parameter number is the valid value), the CPU 201 determines whether the value of the variable i indicating the slider controller is 5 corresponding to the last slider controller before the substitute (step S1603).

When result of the determination in step S1603 is NO (not the last slider controller), the CPU 201 refers to the data in the controller-parameter assignment variable table on the RAM 203 illustrated as an example in FIG. 12A to acquire each of the array data values CtrlMod[i], CtrlType[i], CtrlParam[i], and CtrlPair[i] corresponding to the parameter assigned to the slider controller i. The CPU 201 stores the array data value CtrlMod[i] indicating the effect module corresponding to the parameter assigned to the slider controller i as the variable m on the RAM 203. Hereinafter, this effect module will be referred to as an effect module m. Furthermore, the CPU 201 stores the array data value CtrlType[i] indicating the effect type number corresponding to the parameter assigned to the slider controller i, as the variable t on the RAM 203. Hereinafter, this effect type number is referred to as an effect type number t. Furthermore, the CPU 201 stores the array data value CtrlParam[i] indicating the parameter number of the parameter assigned to the slider controller i as the variable p on the RAM 203. Hereinafter, this parameter is referred to as the parameter p. Furthermore, the CPU 201 stores the array data value CtrlPair[i] indicating the pairing parameter number of a parameter that is paired with the parameter assigned to the slider controller i as the variable pp on the RAM 203. Hereinafter, this pairing parameter number is referred to as a pairing parameter number pp (step S1604).

Next, the CPU 201 performs a duplication checking process to check whether the parameter of the pairing parameter number pp corresponding to the parameter p assigned to the slider controller i is assigned to a slider controller on closer or father than the slider controller i (step S1605).

Figure 17:
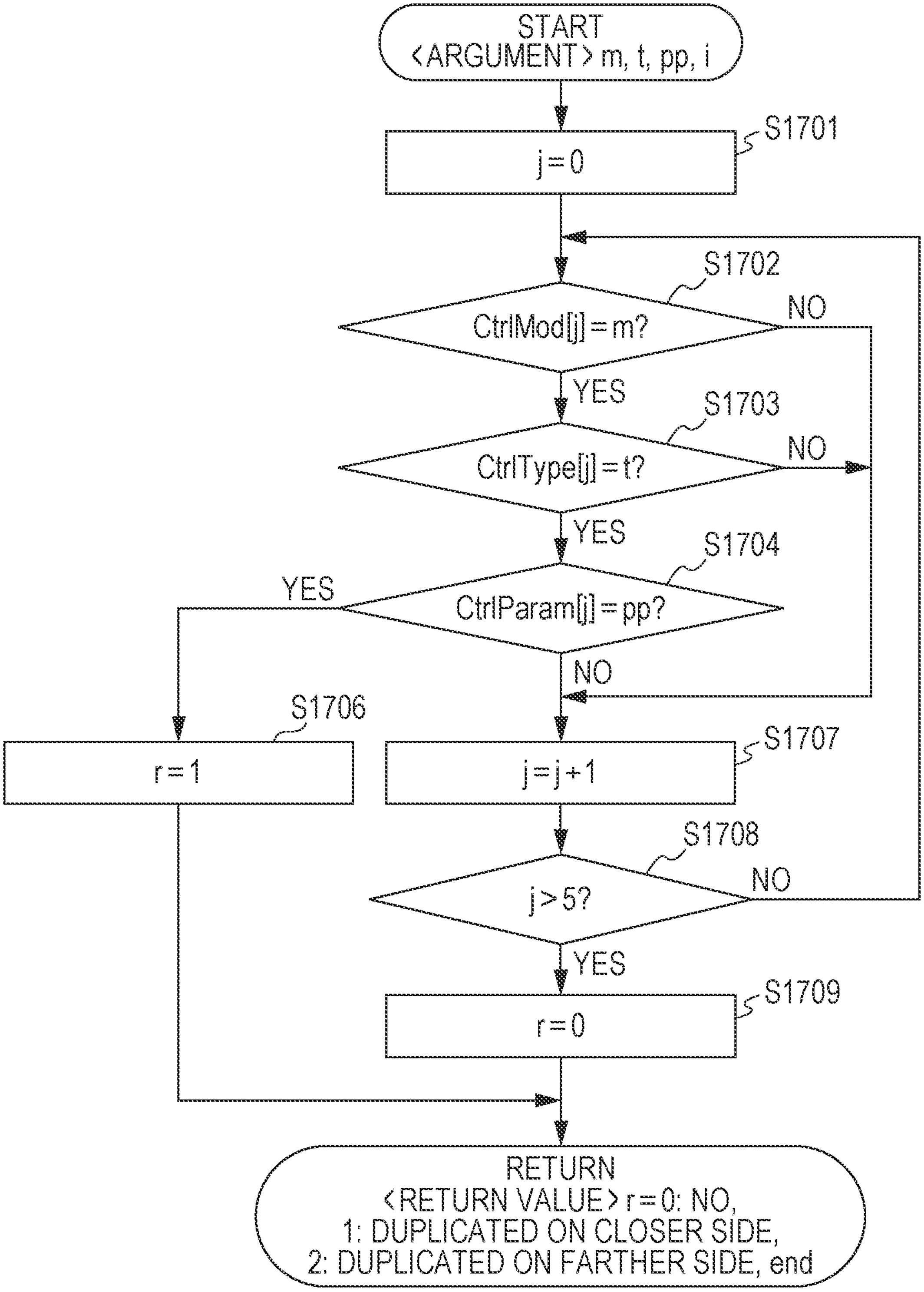
FIG. 17 is a flowchart illustrating a detailed example of a duplication checking process.

FIG. 17 is a flowchart illustrating a detailed example of the duplication checking process in step S1605 in FIG. 16. In the flowchart of FIG. 17, the CPU 201 first initializes the value of the variable j on the RAM 203 designating each slider controller on the effect parameter controller panel 105 to 0 in step S1701. Then, the CPU 210 repeatedly executes an operation in step S1707 to increment the value 1 at a time, until the value is determined to have exceeded the value 5 (refer to the controller internal number in FIG. 12A) corresponding to the last slider controller before the substitute in step S1708. Thus, the CPU 201 executes a series of processes in step S1702 to S1708 for each of the slider controllers (hereinafter, referred to as a duplication checking target slider controller j) designated by a corresponding value of the variable j. As the duplication checking target slider controller j, six slider controllers including a slider controller 0 (=C1) to a slider controller 5 (=C6) as illustrated in FIG. 12B, are designated one by one.

In a series of processes in step S1702 to S1708, the CPU 201 refers to the controller-parameter assignment variable table on the RAM 203 illustrated as an example in FIG. 12A, to determine whether the values in the information on the parameter of the pairing target as the duplication checking target, that is, the effect module m, the effect type number t, and the pairing parameter number pp) respectively match the effect module number CtrlMod[j], the effect type number CtrlType[j], and the effect parameter number CtrlParam[j] assigned to the duplication checking target slider controller j (steps S1702, S1703, and S1704).

When the result of the determination in any of steps S1702, S1703, and S1704 is NO (no match), the CPU 201 proceeds to the process in step S1707 to increment the value of the variable j, to proceed to the process on the next duplication checking target slider controller j.

When the result of the determination in all of steps S1702, S1703, and S1704 are YES (all match), that is, when the parameters assigned to the duplication checking target slider controller j match the parameters of the pairing target that is the duplication checking target, the CPU 201 sets 1 to a value of a variable r on the RAM 203 corresponding to a return value of the duplication checking process in FIG. 17 (step S1706).

After the process in step S1706, the CPU 201 ends the duplication checking process in step S1605 in FIG. 16, illustrated in the flowchart in FIG. 17.

On the other hand, when the duplication check for the last slider controller 5 (=C6) before the substitute ends with the result of the determination in any of steps S1702, S1703, and S1704 being NO (do not match) for all the preceding slider controllers so that the result of the determination in step S1708 is YES, the CPU 201 sets 0 to the variable r on RAM 203 representing the return value of the duplication checking process in FIG. 17 (step S1709). Then, the CPU 201 ends the duplication checking process in step S1605 in FIG. 16, illustrated in the flowchart in FIG. 17.

Referring back to the flowchart in FIG. 16, after the duplication checking process in step S1605 illustrated in the flowchart in FIG. 17 ends, the CPU 201 determines whether the return value r of the duplication checking process is 1 (step S1606).

When the result of the determination in step S1606 is YES (r=1), it means that the number j of the duplication checking target slider controller to which the pairing parameter pp corresponding to the parameter p has already been assigned is smaller than the number i of the slider controller to which the parameter p is assigned (closer). In this case, Rule 2-1 described above is applied, and the CPU 201 proceeds to the process in step S1609 to increment the value of the variable i to process the next slider controller i, while leaving the parameters corresponding to the pairing parameter number as they are.

When the result of the determination in step S1606 is NO (not r=1), it means that the number j of the duplication checking target slider controller to which the pairing parameter pp corresponding to the parameter p has already been assigned is larger than the number i of the slider controller to which the parameter p is assigned (farther) or that the pairing parameter pp is not assigned to the slider controller yet. In this case, 2-3 or 2-3 described above is applied.

In this case, the CPU 201 first acquires the value of the significance corresponding to the pairing parameter number pp of the effect type number t from the effect parameter tables stored in the ROM 202 illustrated as an example in FIGS. 4 to 9, and stores the value as the variable s on the RAM 203 (step S1607).

The CPU 201 executes a parameter insertion process described later (step S1608) described later by using arguments including: the variable m (the effect module number) corresponding to the pairing parameter; the variable t (the effect type number); the variable p stored as the value of the variable pp (the pairing parameter number); the variable s (significance of the pairing parameter); the values of the variable pp stored with the invalid value "−1" (the pairing parameter number for the pairing parameter number); the value=i+1 of the variable c (the number of slider controller for which the insertion is performed); and the value=1 of CtrlValid[c]. As a result, a parameter assigned to the slider controller i and the pairing parameter set to the parameter on the effect parameter table, illustrated as an example in FIGS. 4 to 9, are stored for the slider controller i+1.

After step S1608, the CPU 201 proceeds to a process in step S1609 to increment the value of the variable i, and thus proceeds to the process for the next slider controller i.

When it is determined that the pairing parameter number is a valid value in step S1602 described above and that the value of the variable i is equal to 5 in step S1603 meaning that the value is equal to the number 5 (=C6) of the last slider controller before the substitute, the results of the determination in these steps are YES. In this case, according to Rule 2-2 described above, there is no room for further assigning a pairing parameter to the last slider controller 5 before the substitute to which the parameter is assigned. Thus, the parameter to which the pairing parameter number is set is eliminated, to be replaced with the substitute parameter with the seventh priority level. When the parameter with the seventh priority level also has a pairing parameter number, the parameter is also eliminated, resulting in no parameter assigned to the last slider controller 5.

In order to implement the control of the above Rule 2-2, the CPU 201 determines whether the array value CtrlPair[6] indicating the pairing parameter number of the parameter assigned to the substitute slider controller 6 indicates an invalid value (step S1611).

When the result of the determination in step S1611 is YES, the CPU 201 promotes the array data values of the substitute array data CtrlValid[6] (valid data), CtrlMod[6] (effect module number), CtrlType[6] (effect type number), CtrlParam[6] (effect parameter number), CtrlSig[6] (significance), and CtrlPair[6] (pairing parameter number) to the array data pieces CtrlValid[5], CtrlMod[5], CtrlType[5], CtrlParam[5], CtrlSig[5], and CtrlPair[5] of the last slider controller 5 in step S1612, and stores them in the controller-parameter assignment variable table (see FIG. 12A) on the RAM 203.

On the other hand, when the result of the determination in step S1611 is NO, the CPU 201 sets an invalid value to the array data CtrlValid[5] of the last slider controller 5 in step S1613.

After the processes in step S1612 or S1613 or when the result of the determination in step S1610 is YES, the CPU 201 ends the process in the flowchart in FIG. 16, and ends the pairing process in step S1404 in the flowchart of FIG. 14A in the parameter automatic assignment process in step S1304 in FIG. 13.

Figure 18:
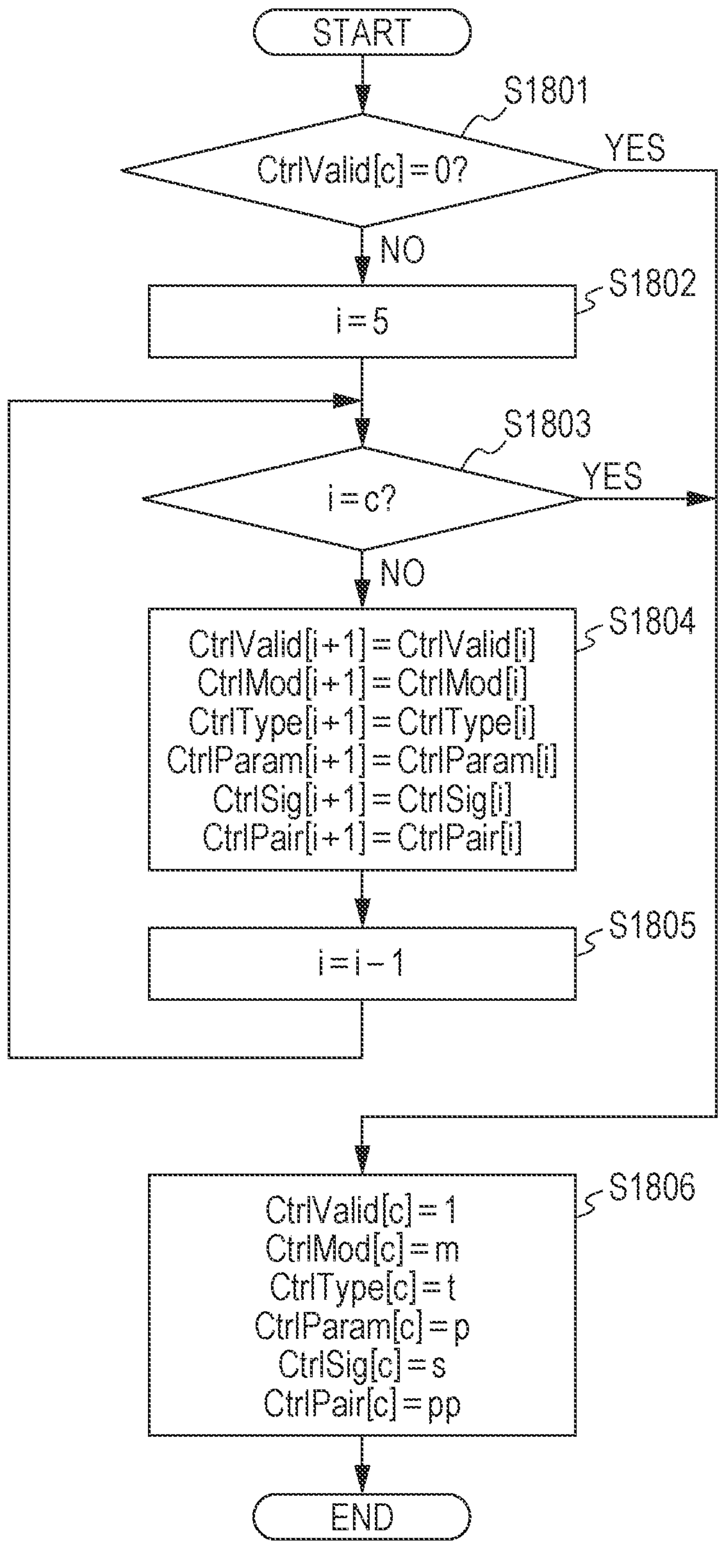
FIG. 18 is a flowchart illustrating a detailed example of a parameter data insertion process.

FIG. 18 is a flowchart illustrating details of the parameter data insertion process executed in step S1513 in FIG. 15 or step S1608 in FIG. 16. This parameter data insertion process uses arguments that have been obtained in the processes in the flowchart in FIG. 15 or FIG. 16. The arguments include values of the variable m (effect module number), the variable t (effect type number), the variable p (parameter number), the variable s (significance), and the variable pp (pairing parameter number), as well as the value=i+1 of the variable c (the number of the slider controller for which the insertion is performed) and a value of CtrlValid[c].

In the flowchart of FIG. 18, the CPU 201 first determines whether the value of CtrlValid[c] is an invalid value 0 (step S1801).

When the flowchart in FIG. 18 is executed as step S1513 in FIG. 15 due to the result of the determination in step S1508 in FIG. 15 being YES, the result of the determination in step S1801 is YES. In this case, the target slider controller c is invalid. Thus, it is not necessary to shift the assignment to the slider controllers in steps S1802 to S1805, and the parameter may be directly set to the slider controller c that is invalid. Thus, the CPU 201 stores information on parameters to be newly assigned to each array data in the area of the controller-parameter assignment variable table on the RAM 203 designated by the slider controller c (step S1806). Specifically, the valid value 1 is stored as the array data CtrlValid[c] indicating the validity flag. The value of the variable m that has been obtained as an argument is stored as array data CtrlMod[c] indicating the effect module number. The value of the variable t that has been obtained as an argument is stored as array data CtrlType[c] indicating the effect type number. The value of the variable p that has been obtained as an argument is stored as array data indicating the effect parameter number. Furthermore, the value of the variable s that has been obtained as an argument is stored as array data CtrlSig[c] indicating the significance. The value of the variable pp that has been obtained as an argument is stored as array data CtrlPair[c] indicating the pairing parameter number. Then, the CPU 201 ends the parameter data insertion process in step S1513 in FIG. 15 illustrated in the flowchart in FIG. 18.

When the result of the determination in step S1801 is NO, the CPU 201 sets the variable i on the RAM 203 to 5 (step S1802). Then, the CPU 201 repeatedly executes the process in step S1804 while decrementing the value of the variable i by 1 at a time in step S1805, until the value of the variable i is determined to have matched the value of the variable c indicating the number of target slider controller that has been obtained as an argument in step S1803. As a result, the information on the assigned parameter of the last slider controller 5 (=C6) before the substitute to the slider controller c+1 is sequentially shifted to the subsequent slider controller (slider controller 6 to slider controller c+2). In the case of FIG. 16, this process corresponds to Rule 2-3 described above.

Specifically, the CPU 201 replaces the array data values of the substitute array data CtrlValid[i] (valid data), CtrlMod [i] (effect module number), CtrlType[i] (effect type number), CtrlParam[i] (effect parameter number), CtrlSig[i] (significance), and CtrlPair[i] (pairing parameter number) which have been assigned to the slider controller i with the array data pieces CtrlValid[i+1], CtrlMod[i+1], CtrlType[i+1], CtrlParam[i+1], CtrlSig[i+1], and CtrlPair[i+1] of the slider controller i+1 in step S1804, and stores them in the controller-parameter assignment variable table (see FIG. 12A) on the RAM 203.

The processes in steps S1803 to S1805 described above are repeatedly executed on the values i=5 to i=c+1 of the variable i. As a result, the information on the parameters of the slider controller c+1 to the slider controller 5 is shifted to the slider controller c+2 to the slider controller 6, leaving the slider controller c+1 vacant. When the result of the determination in step S1803 is YES with the value of the variable i being equal to the value of the variable c, the CPU 201 proceeds to the process in step S1806. In this step, the information on a parameter that has been obtained as an argument is stored as the array data of the slider controller c.

In the flowchart of the parameter automatic assignment process in FIG. 14A, the CPU 201 executes a sort process (step S1405) after the pairing process in step S1404. This process corresponds to the above-described process of "Rule 3: Sort by order of effect modules". In this process, the CPU 201 executes the sort process to change the order in the column direction in the controller-parameter assignment variable table, illustrated as an example in FIG. 12A, stored in the RAM 203. Specifically, the information on the parameters assigned to the slider controllers of the effect parameter controller panel 105 is sorted to be in the order of the effect modules of the slider switches FX1, FX2, FX3, and FX4 on the effect module selection panel 103, and the parameters in a single module are arranged in the order determined by the parameter numbers.

After the above operation, the CPU 201 ends the parameter automatic assignment process in step S1304 in FIG. 13, illustrated in the flowchart in FIG. 14A.

With the embodiment described above, the controller assignment recommended to a user can be automatically generated immediately in response to selection of an effect module. Thus, an automatic effect parameter assignment apparatus enabling a huge labor reduction can be provided.

The present invention is not limited to the above-described embodiment, and can be modified in various ways without departing from the gist thereof to be implemented. Furthermore, any possible combination of functions executed in the embodiment described above can be implemented as appropriate. The above-described embodiment includes various stages, and various inventions may be provided by appropriately combining a plurality of disclosed components. For example, a configuration as a result of deleting some of all of the components described in the embodiment may be provided as an invention as long as the advantageous effect can be obtained despite the deletion.

What is claimed is:

1. An effect adding apparatus comprising:

a plurality of first operation elements operable by a user to change parameters assigned to the respective first operation elements; and at least one processor configured to execute processes comprising:

selecting a parameter to be assigned to each of the first operation elements, from among a plurality of parameters corresponding to designated effects, the designated effects being effects designated from among plural selectable effects;

when a plurality of the plural selectable effects including a first effect and other effects are to be used in combination as the designated effects, changing the parameters to be assigned to the plurality of first operation elements from among the plurality of parameters corresponding to the first effect in response to a change in the other effects to be combined with the first effect; and adding the designated effects to a musical sound generated by a sound source.

2. The effect adding apparatus according to claim 1, wherein the processes further comprise, when a number of the plurality of parameters corresponding to the respective designated effects is larger than a number of the first operation elements, by using at least one of first information indicating priority levels of the plurality of parameters and second information indicating how each of the plurality of parameters is to be used in combination with others of the plurality of parameters, selecting the parameters to be assigned to the plurality of first operation elements from among the plurality of parameters, and changing the parameters to be assigned to the plurality of first operation elements from among the plurality of parameters corresponding to the first effect in response to a result of the selection.

3. The effect adding apparatus according to claim 2, wherein the processes further comprise, in a state in which (i) a first parameter corresponding to the first effect is assigned to the plurality of first operation elements, and (ii) a second effect having a second parameter is added to the combination and a priority level of the second parameter is higher than a priority level of the first parameter, releasing an assignment of the first parameter corresponding to the first effect, and assigning the second parameter corresponding to the second effect to the plurality of first operation elements.

4. The effect adding apparatus according to claim 2, wherein the processes further comprise, in a state in which (i) a first parameter corresponding to the first effect is assigned to the plurality of first operation elements, (ii) a second effect having a second parameter is added to the combination and a priority level of the second parameter is higher than a priority level of the first parameter, and (iii) a third parameter of the first effect is still assigned to the plurality of first operation elements and the first parameter is designated to be used in combination with the third parameter, not releasing an assignment of the first parameter corresponding to the first effect.

5. The effect adding apparatus according to claim 2, wherein the selecting comprises selecting the parameters to be assigned to the first operation elements, from among the plurality of parameters corresponding to the designated effects, by using both the first information and the second information.

6. The effect adding apparatus according to claim 1, further comprising:

a series of effect modules each configured to assigned a respective one of the designated effects from among a plurality of the plural selectable effects, the effect modules being configured to add a plurality of the plural selectable effects in combination to the musical sound; and a plurality of second operation elements operable by a user to select the respective designated effects to be assigned to the plurality of effect modules from among the plurality of selectable effects, wherein the processes further comprise, when a combination of a plurality of effects to be assigned to the series of effect modules is changed by operation of the plurality of second operation elements, changing the parameters to be assigned to the plurality of first operation elements.

7. An electronic musical instrument comprising:

the effect adding apparatus according to claim 1;

a performance operation element operable by a user to designate a pitch;

the sound source, the sound source being configured to emit, as the musical sound, a musical sound that corresponds to the pitch designated by an operation of the performance operation element and that serves as a target to which the designated effects are added; and a display configured to display an indication of the parameters assigned to the plurality of first operation elements.

8. A method performed by a computer of an effect adding apparatus including at least one processor and a plurality of first operation elements operable by a user to change parameters assigned to the respective first operation elements, the method being performed under control of the at least one processor, and the method comprising:

selecting a parameter to be assigned to each of the first operation elements, from among a plurality of parameters corresponding to designated effects, the designated effects being effects designated from among plural selectable effects;

when a plurality of the plural selectable effects including a first effect and other effects are to be used in combination as the designated effects, changing the parameters to be assigned to the plurality of first operation elements from among the plurality of parameters corresponding to the first effect in response to a change in the other effects to be combined with the first effect; and adding the designated effects to a musical sound generated by a sound source.

* * * * *